US009124140B2

(12) United States Patent
Li et al.

(10) Patent No.: US 9,124,140 B2
(45) Date of Patent: Sep. 1, 2015

(54) INTELLIGENT POWER CONVERTER CONTROL FOR GRID INTEGRATION OF RENEWABLE ENERGIES

(75) Inventors: Shuhui Li, Northport, IL (US); Tim A. Haskew, Northport, AL (US)

(73) Assignee: The Board of Trustees of the University of Alabama, Tuscaloosa, AL (US)

(*) Notice: Subject to any disclaimer, the term of this patent is extended or adjusted under 35 U.S.C. 154(b) by 1003 days.

(21) Appl. No.: 13/257,799

(22) PCT Filed: Mar. 29, 2010

(86) PCT No.: PCT/US2010/029032
§ 371 (c)(1),
(2), (4) Date: Dec. 22, 2011

(87) PCT Pub. No.: WO2010/114792
PCT Pub. Date: Oct. 7, 2010

(65) Prior Publication Data
US 2012/0112551 A1    May 10, 2012

Related U.S. Application Data

(60) Provisional application No. 61/165,622, filed on Apr. 1, 2009.

(51) Int. Cl.
*H02J 3/00*    (2006.01)
*H02J 3/38*    (2006.01)
*H02P 9/10*    (2006.01)
*H02P 101/15*  (2015.01)

(52) U.S. Cl.
CPC .............. *H02J 3/386* (2013.01); *H02P 9/105* (2013.01); *H02P 2101/15* (2015.01); *Y02E 10/763* (2013.01); *Y10T 307/707* (2015.04)

(58) Field of Classification Search
CPC .................................... H02J 3/00; H02J 3/386
See application file for complete search history.

(56) References Cited

U.S. PATENT DOCUMENTS 6,710,574 B2 *   3/2004   Davis et al. ................. 318/800

FOREIGN PATENT DOCUMENTS

WO    WO2008137836    * 11/2008

OTHER PUBLICATIONS

Glanzmann "FACTS Flexible Alternating Current Transmission Systems". pp. 1-31, Jan. 14, 2005.*

* cited by examiner

*Primary Examiner* — Rexford Barnie
*Assistant Examiner* — Terrence Willoughby
(74) *Attorney, Agent, or Firm* — Meunier Carlin & Curfman LLC

(57) ABSTRACT

Embodiments according to the present invention provide methods and a system for a control approach that effectively maintains the DC link voltage at a constant set value under variable system conditions and keeps the converter operating with an optimal power factor range while limiting power quality effects and phase balance.

15 Claims, 35 Drawing Sheets

Grid-side converter d-q equivalent circuit

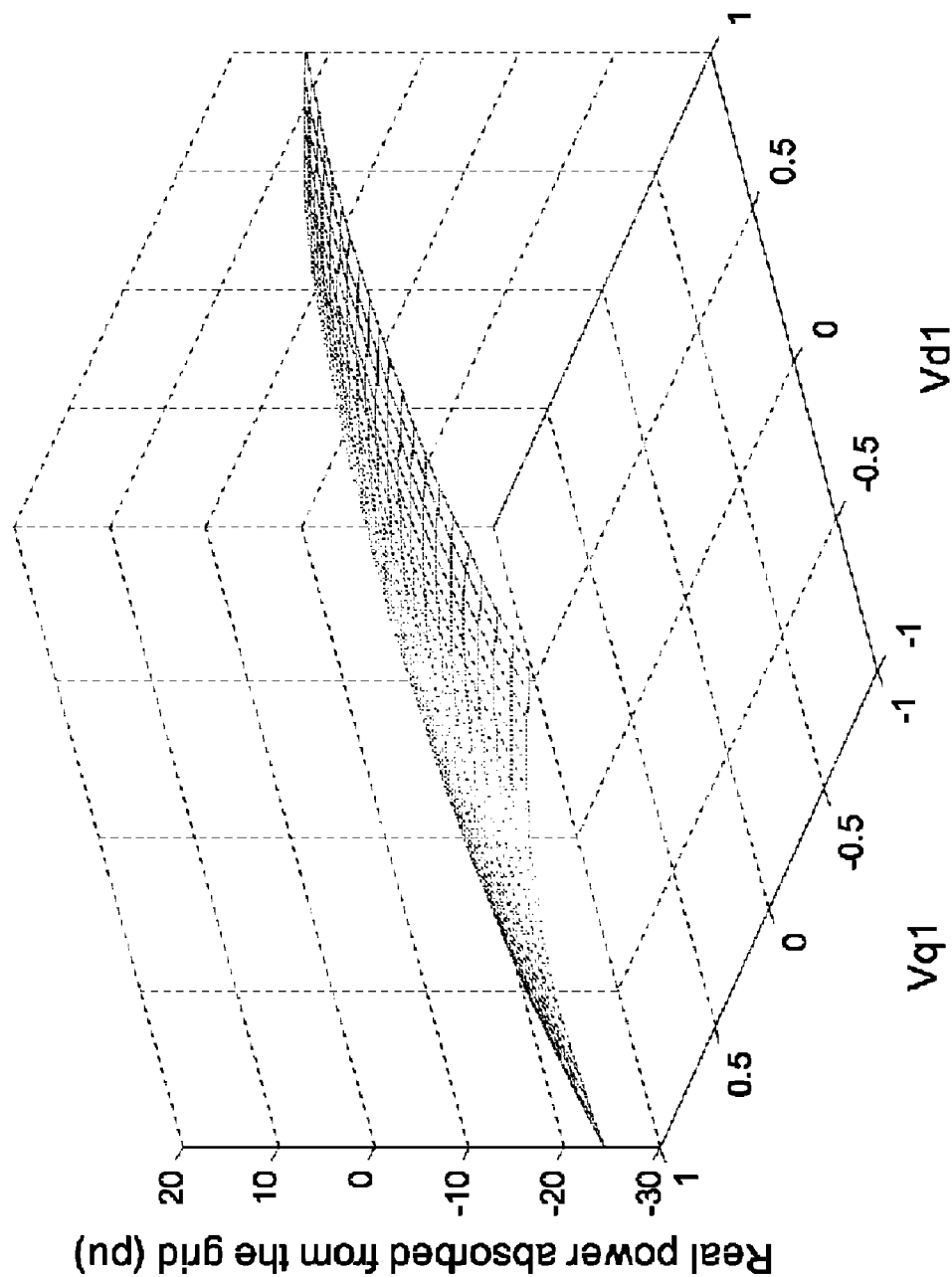

Characteristics of reactive power absorbed from the grid

Amplitude of the injected voltage to the grid by grid-side converter

A system block diagram for design of conventional current-loop controller

A system block diagram for design of voltage-loop controller

Conventional decoupled d-q vector control structure for grid-side converter

Front-end converter with feedback control

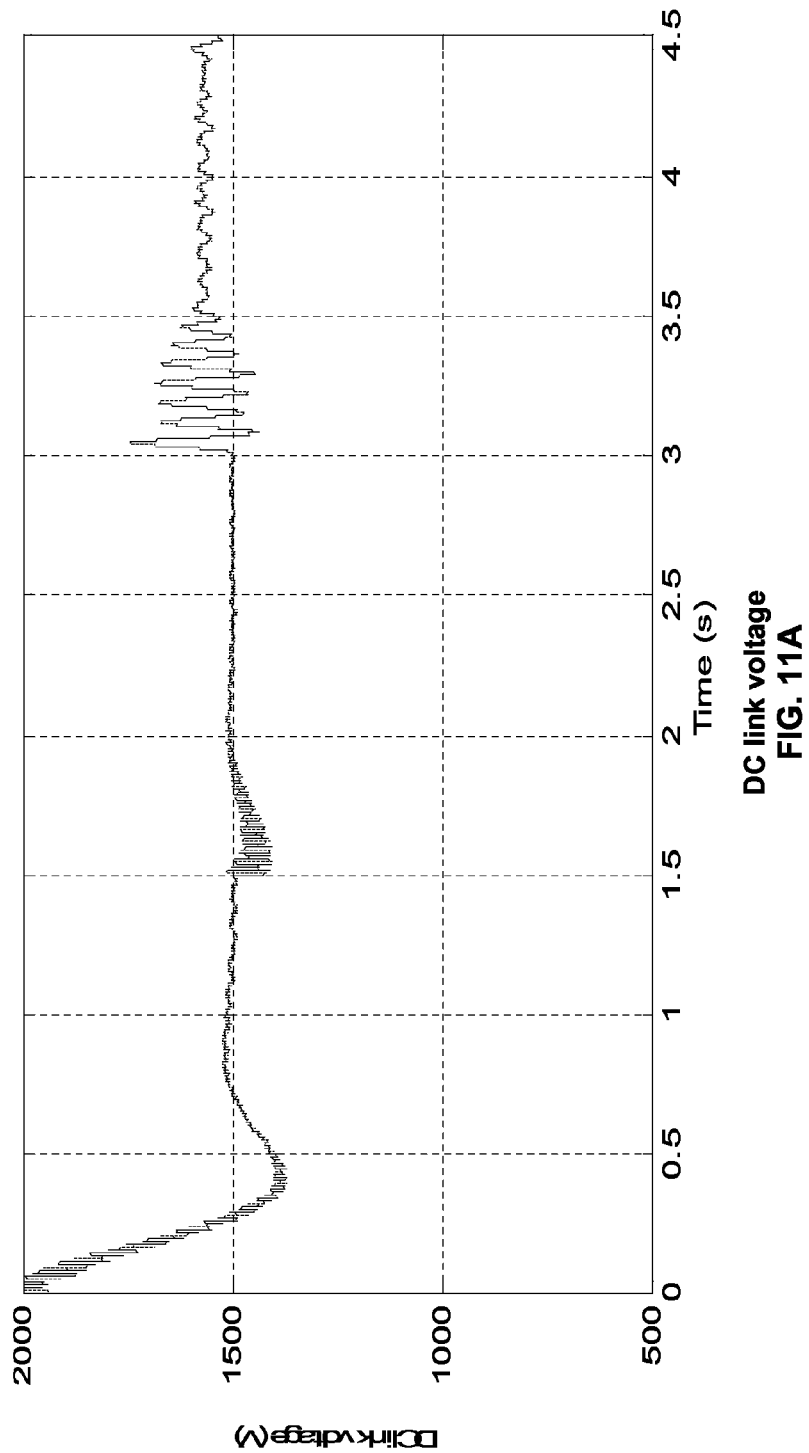

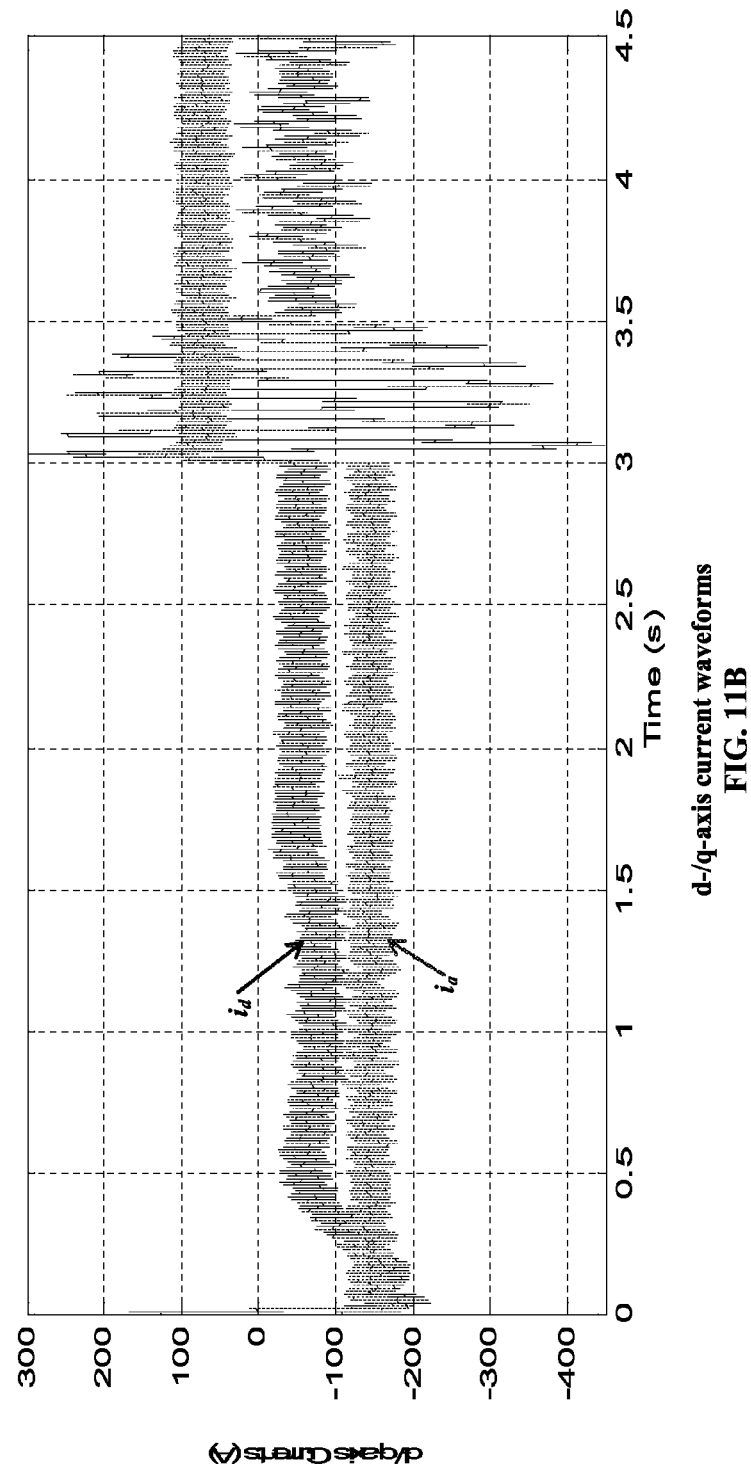

Real/Reactive power waveforms

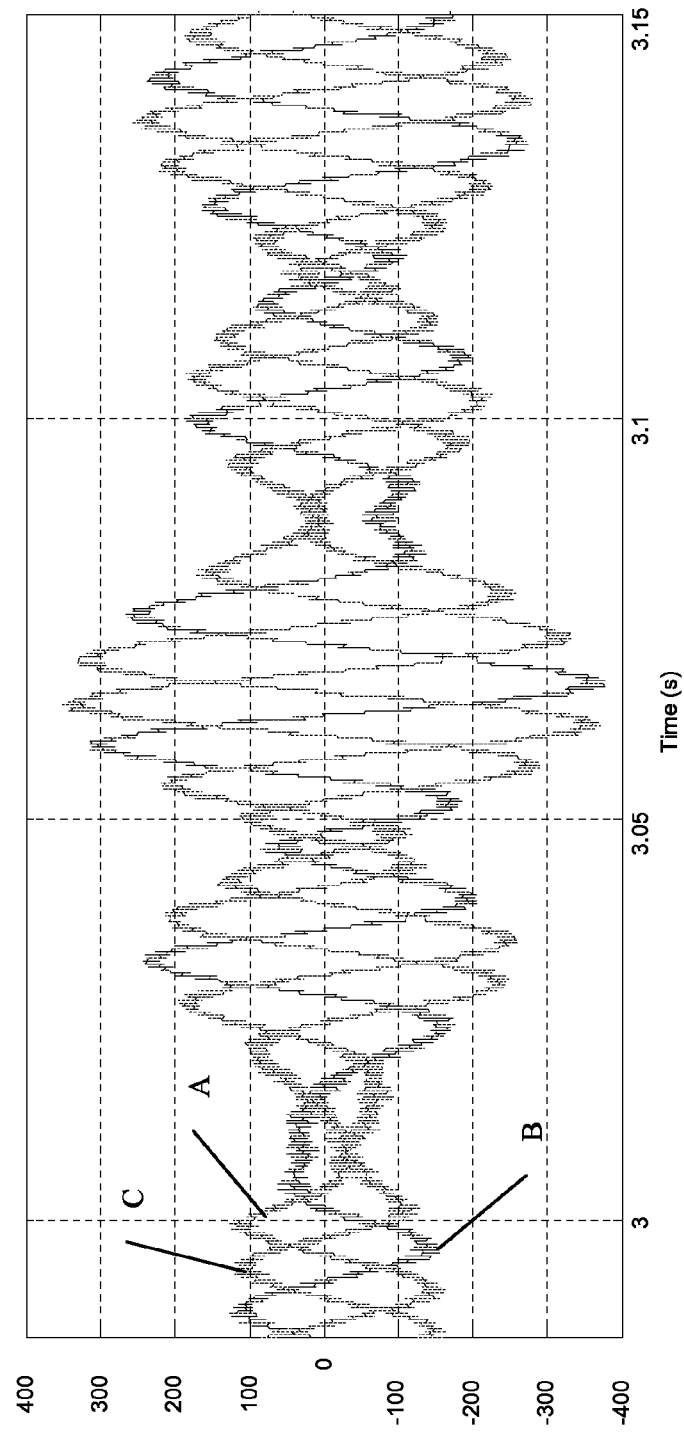

An embodiment of a converter control system

An embodiment of a converter control system

Performance of intelligent controller ($R_f$=0.012Ω and $L_f$=0.005mH) d-/q-axis current waveforms

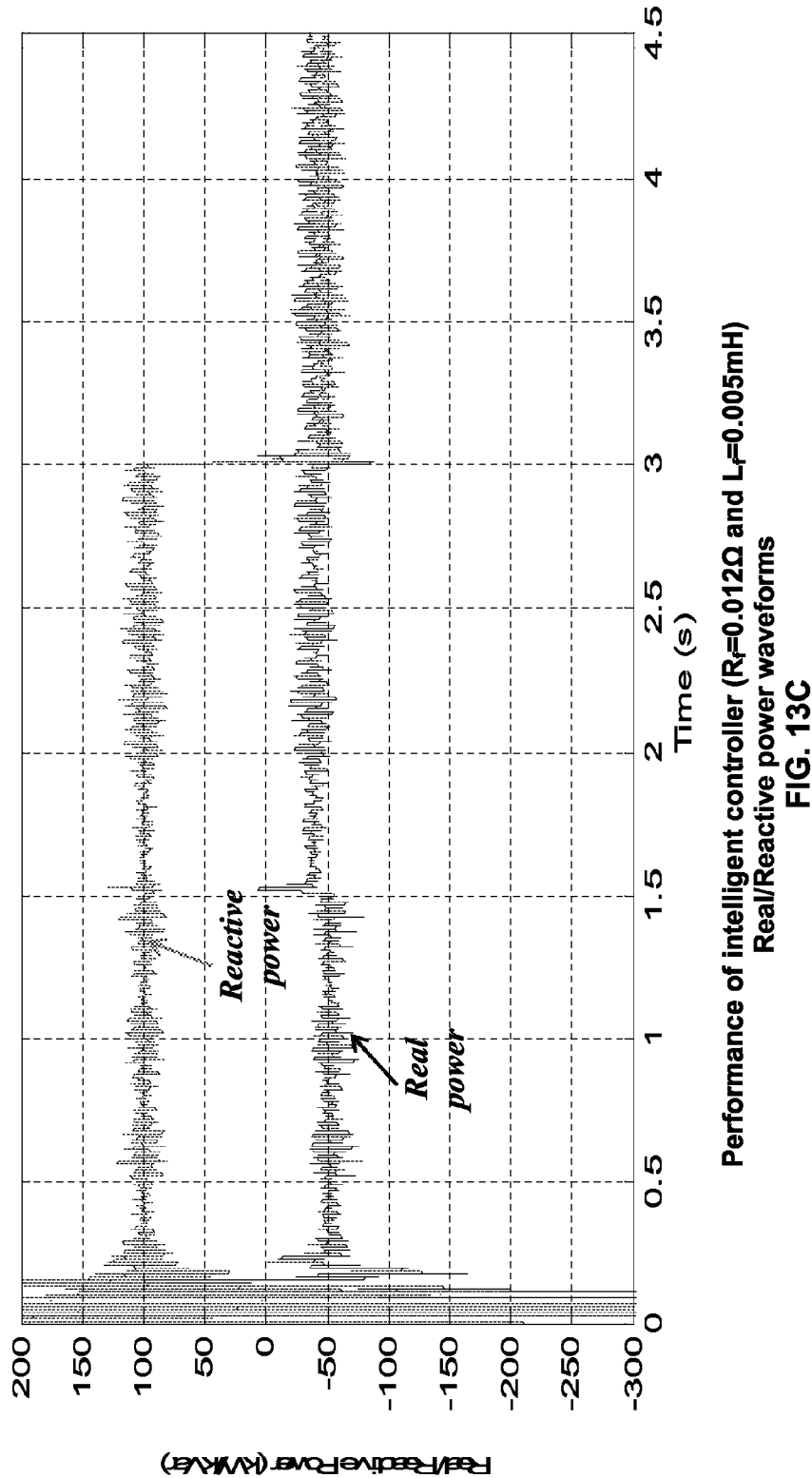

Performance of intelligent controller ($R_f=0.012Ω$ and $L_f=0.005mH$)
Three-phase current waveforms on the grid side Transient simulation under decoupled open-loop d-q control in a grid-voltage-oriented frame Transient power control characteristics under dq open-loop control

Front-end converter system with feedback control

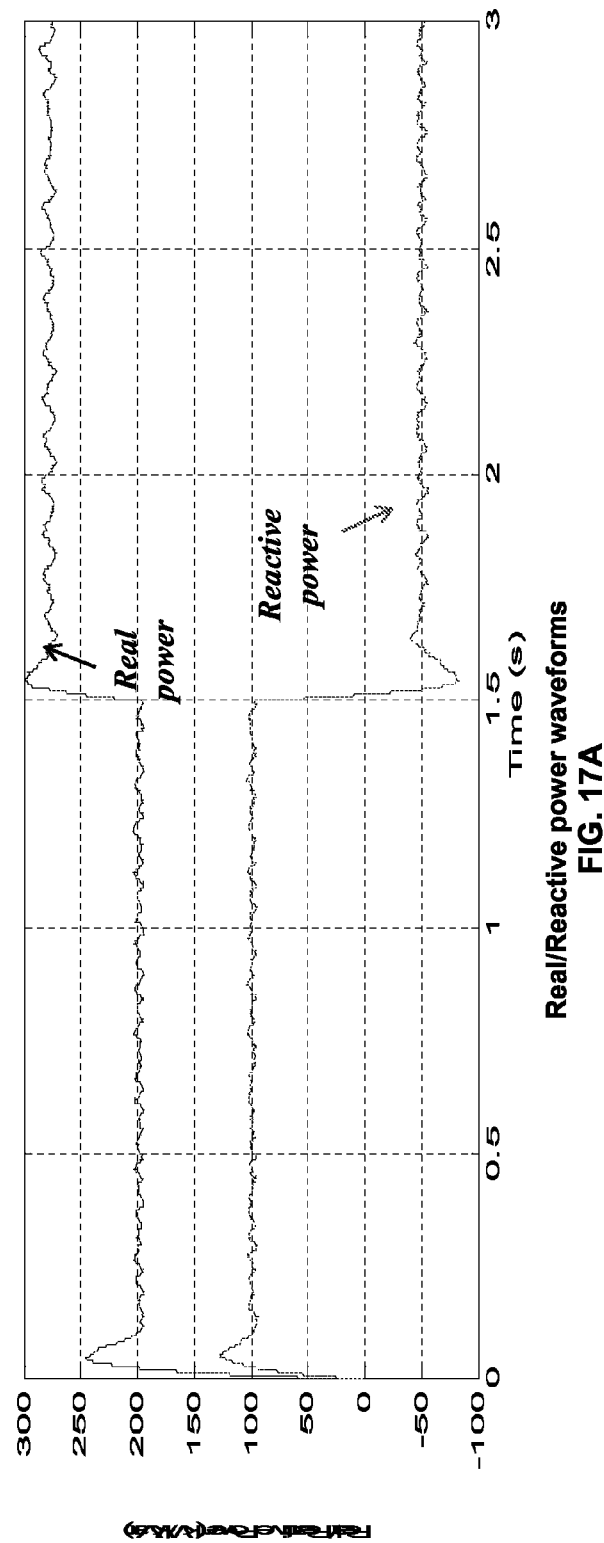
FIG. 17A Real/Reactive power waveforms d-/q-axis current waveforms

Real/Reactive power waveforms d-/q-axis current waveforms

Real/Reactive power waveforms d-/q-axis current waveforms

Three-phase current waveform as the system is stable

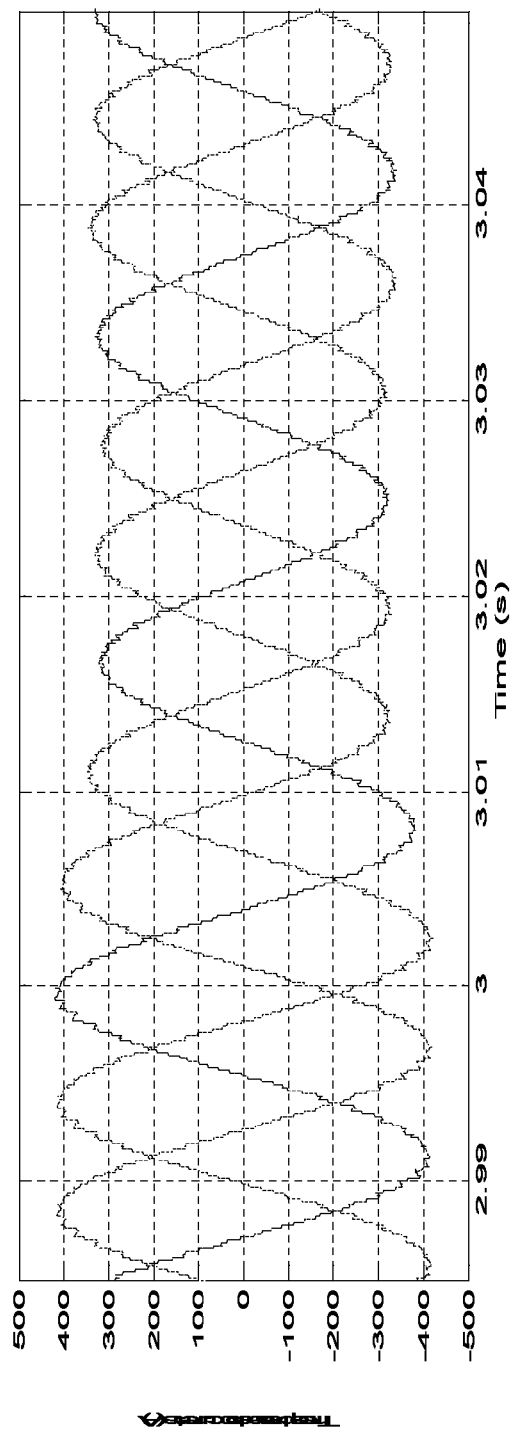

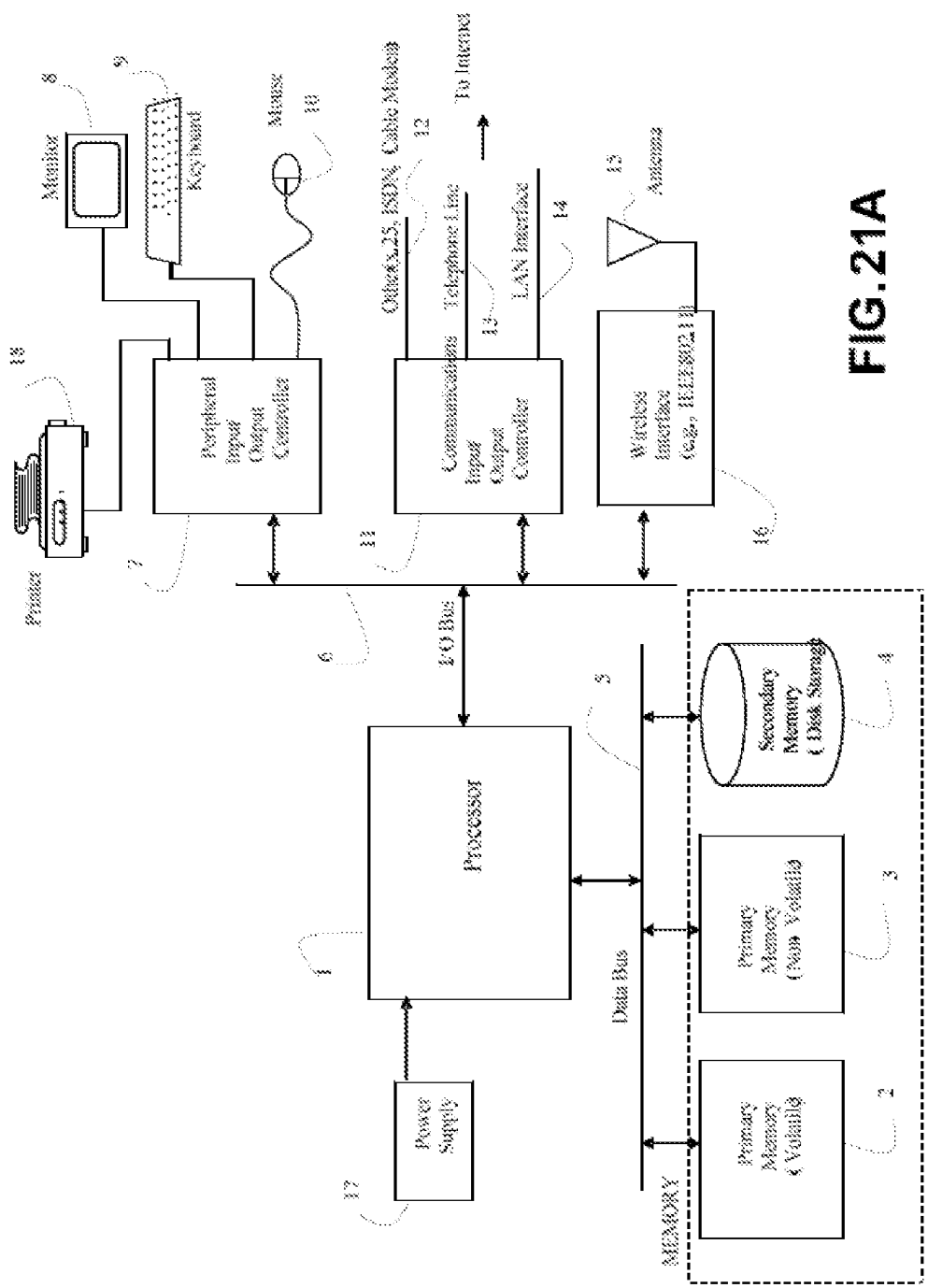

INTELLIGENT POWER CONVERTER CONTROL FOR GRID INTEGRATION OF RENEWABLE ENERGIES

CROSS-REFERENCE TO RELATED APPLICATION

This application claims benefit of and priority to U.S. Provisional Patent Application No. 61/165,622, filed Apr. 1, 2009, which is hereby fully incorporated by reference and made a part hereof.

FIELD

Embodiments of this invention relate generally to control systems and more specifically to converter control for grid integration of renewable energy sources such as variable-speed wind turbines, solar photovoltaic cells, and fuel cells. Embodiments of the invention also relate to control of FACTS (flexible alternating-current transmission systems) family devices using voltage source PWM converters, such as STAT-COM (static synchronous compensator), UPFC (unifier power flow controller), and HVDC (high-voltage direct current).

BACKGROUND

Investment in renewable energy is rapidly increasing worldwide. This is in response to a number of global challenges and concerns, including climate change, increasing energy demand and energy security. The investment is widely spread over the leading renewable energy technology sectors such as wind, solar, biofuels, biomass and fuel cells. Among those, biofuels and biomass use the same principle as that used in traditional electric utilities for electric power generation, but wind, solar, and fuel cells employ completely different technologies and usually require power electronic converters for grid integration of those renewable resources.

There are basically two converter structures used for grid integration of renewable energies: a DC/DC/AC converter for, for example, solar and fuel cell applications; and, an AC/DC/AC converter for, for example, wind power applications. FIGS. 1A and 1B show different embodiments of an exemplary AC/DC/AC converter structure in wind power applications. For both, the converter is built by two self-commutated back-to-back pulse-width modulation (PWM) converters, a converter on the renewable energy source side and a converter on the grid side, with an intermediate DC voltage link. By controlling the converters on both sides, it is expected to adjust renewable energy source characteristics so as to achieve maximum power conversion capability and to control its power generation with less fluctuation. However, to meet this need, the grid-side or front-end converter is controlled in such a way as to maintain a constant DC-link capacitor voltage and to keep the converter operation with a desired power factor while the unbalance and harmonics in the grid system must be low. For example, Codd as well as Xu and Wang (I. Codd, "Windfarm Power Quality Monitoring and Output Comparison with EN50160", Proc. of the 4th Intern. Workshop on Large-scale Integration of Wind Power and Transmission Networks for Offshore *Wind Farm,* 20-21 Oct. 2003, Sweden; and L. Xu, and Y. Wang, "Dynamic Modeling and Control of DFIG Based Wind Turbines under Unbalanced Network Conditions", IEEE Transactions on Power Systems, Vol. 22, No. 1, February 2007; both fully incorporated herein by reference), have shown that wind farms periodically experience unbalance and high harmonic distortions, which not only presents challenges to the proper operation of electric power grid but also results in a large number of generator trips.

Current grid-side PWM converter control is generally a nested-loop controller operating in a grid AC voltage reference frame as shown by FIG. 2 using a current-regulated voltage-source PWM converter scheme. In this embodiment, the d-q voltage control signals in the grid-side controller are obtained by comparing the d- and q-current setpoints to the actual d- and q-currents to the grid as shown in the second stage controller in FIG. 2, and are final control actions actually applied to the grid-side converter. Present technology uses d-axis voltage, $v_{d1}^*$ for DC link voltage control, and q-axis voltage, $v_{q1}^*$, for reactive power control. The control of the grid-side converter is important because if the control goals of the grid-side converter cannot be met, all other control objectives will be affected in a renewable energy system.

The existing technology for grid-side PWM converter control has theoretical deficiencies in nature. It can cause major periodic unbalance to influence the proper operation of both renewable energy and grid systems. Therefore, control systems and methods are desired that overcome challenges present in the art, some of which are described above.

SUMMARY

Embodiments described herein provide a d-q vector control approach for the purpose of improving DC link voltage and reactive power control effectiveness and for the purpose of achieving enhanced power quality.

In various aspects, embodiments of the present invention use d-axis current, $i_d$, for DC link voltage control, and q-axis current, $i_q$, for reactive power control through a nested current and voltage loop controller; the current-loop controller generates a current signal instead of a voltage signal; nonlinear programming formulation is provided for the design of the control system; utilization of technologies and concepts involving in i) signal processing, ii) fuzzy control, iii) adaptive control, and iv) conventional PID control; and, development of a grid-side converter control system that is not only effective in DC link voltage control but also valuable in maintaining a high power quality in terms of unbalance and harmonics. Embodiments described herein are robust, stable, well performed, and adaptable to widely variable system conditions.

One purpose of embodiments described herein is to develop an intelligent control approach that can effectively keep the DC link voltage in a constant set value under variable system conditions and to control the reactive power absorbed from grid at a desired reactive power reference. At the same time, the power quality in terms of unbalance and harmonics must be low.

The embodiments described herein can be used in some instances as an improvement to existing control systems and methodologies such as, for example those described in International Application Number: PCT/US2008/062641, International Publication No. WO 2008/137836 A1 (published Nov. 13, 2008), filed May 5, 2008 and claiming priority to U.S. Provisional Patent Application No. 60/916,007, which was filed on May 4, 2007, entitled "CONVERTER CONTROL OF VARIABLE-SPEED WIND TURBINES," which is fully incorporated herein by reference and made a part hereof.

Additional advantages of the invention will be set forth in part in the description which follows, and in part will be obvious from the description, or may be learned by practice of the invention. The advantages of the invention will be realized and attained by means of the elements and combinations particularly pointed out in the appended inventive concepts. It is to be understood that both the foregoing general description and the following detailed description are exemplary and explanatory only and are not restrictive of the invention, as claimed.

BRIEF DESCRIPTION OF THE DRAWINGS

The accompanying drawings, not drawn to scale, which are incorporated in and constitute a part of this specification, illustrate embodiment(s) of the invention and together with the description, serve to explain the principles of the invention:

FIGS. 6A-6C show power control characteristics of an embodiment of a front-end converter under a combined $V_{d1}$ and $V_{q1}$ control in a 3D domain for a typical per-unit impedance value of the grid filter;

FIGS. 11A-11D demonstrate the performance of the traditional d-q control approach for a constant DC link voltage reference at, for example, 1500V and a changeable reactive power reference;

FIG. 13C illustrates that on the grid side, both real and reactive powers are now stable even for transitions of a reactive power reference from absorbing to generating;

FIGS. 17A and 17B demonstrate a situation that the real and reactive power is controllable using the traditional d-q control approach under a constant DC link voltage condition as shown by FIG. 16;

FIGS. 20A and 20B present current waveforms, under a constant DC link voltage condition, associated with an embodiment of the proposed control approach such as the one shown in FIG. 12A;

FIG. 21A is an exemplary computing device that can be used to practice aspects of the embodiments of the invention.

DETAILED DESCRIPTION

Figure 1A:
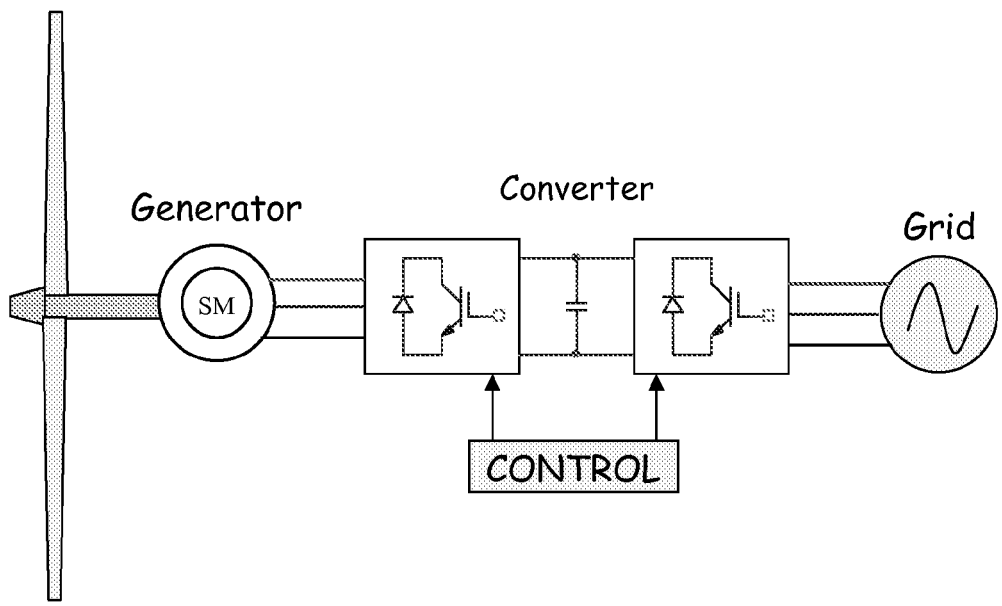
FIG. 1A illustrates an embodiment of a variable-speed synchronous generator wind turbine.
Figure 1B:
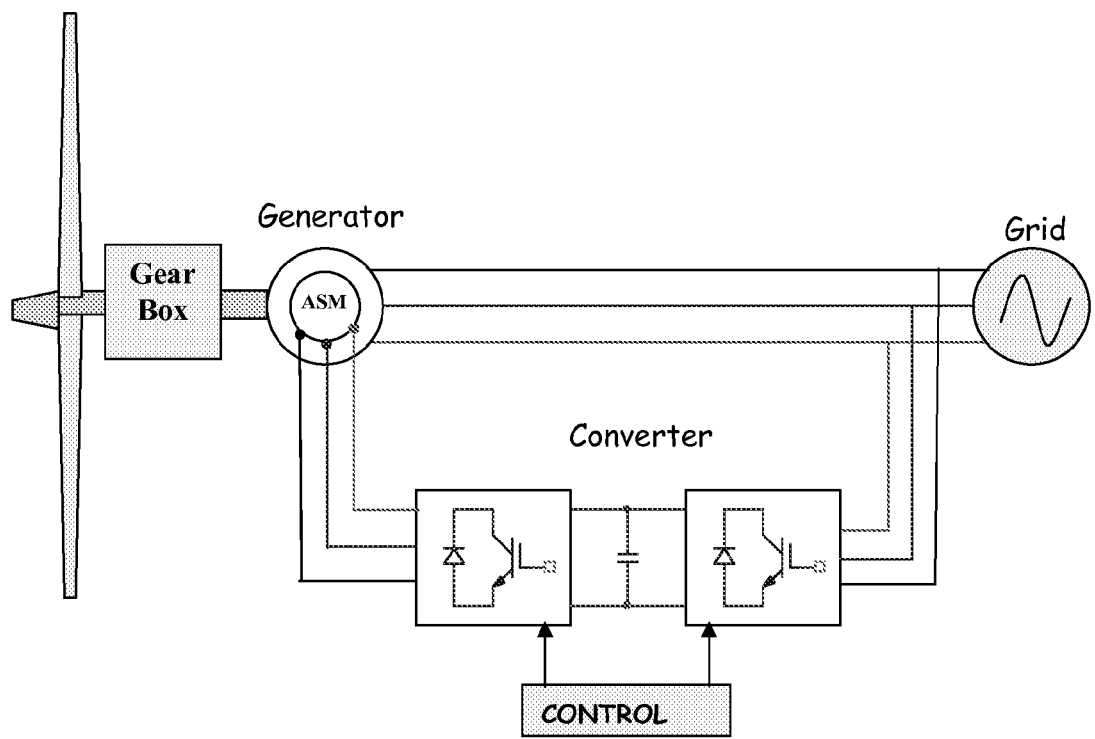
FIG. 1B illustrates an embodiment of a variable-speed doubly-fed induction generator wind turbine.

Embodiments of the present invention may be understood more readily by reference to the following detailed description and the examples included therein and to the figures and their previous and following description.

As used in the specification and the appended claims, the singular forms "a," "an" and "the" include plural referents unless the context clearly dictates otherwise. Thus, for example, reference to "a" or "an" endpoint device may include two or more endpoint devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the present embodiments according to the invention, examples of which are illustrated in the accompanying drawings. Wherever possible, the same reference numbers are used throughout the drawings to refer to the same or like parts.

As will be appreciated by one skilled in the art, the preferred embodiment or aspects of the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment or aspects of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, magnetic storage devices, etc.

The preferred embodiments according to the present invention are described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus, such as the ones described below, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2:
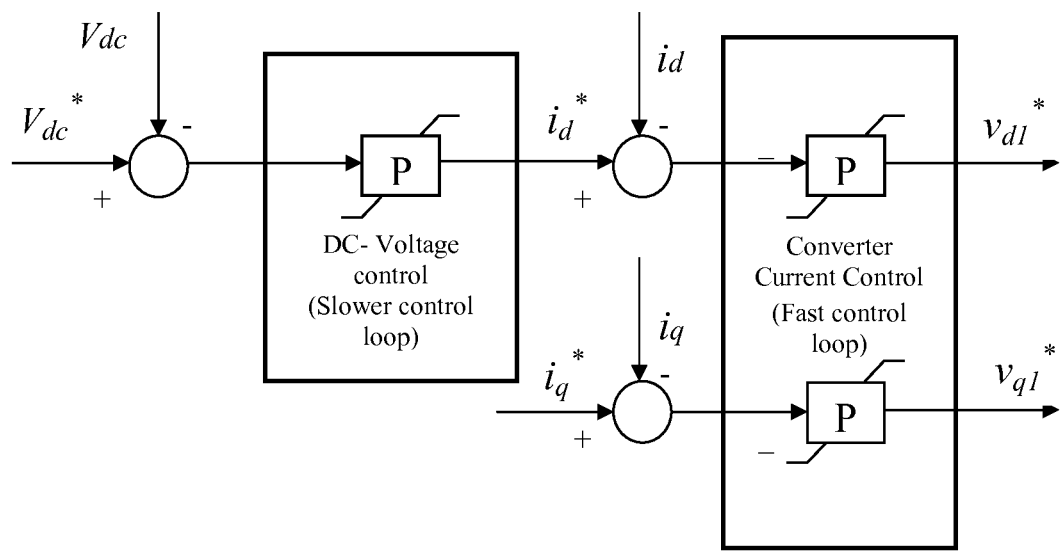
FIG. 2 illustrates an embodiment of a conventional grid-side converter controller in variable-speed wind turbine generators.

Present technology for controlling a grid-side PWM converter is generally a two-stage controller operating in a grid AC voltage reference frame as shown by FIG. 2. When using the grid AC voltage as the reference frame, the d-axis current represents the active component, and the q-axis current represents the reactive component. Although this decoupled d-q current control concept can be implemented through a current-source PWM converter, a challenge with this design is that the switching frequency is not constant within the converter. To maintain a constant switching frequency, a common practice is to control the d and q currents indirectly through a current-regulated voltage-source PWM converter. The d-q voltage control signals of the converter are obtained by comparing the d- and q-current setpoints to the actual d- and q-currents in the grid, as shown by the second stage controller in FIG. 2. For such a design, it is the d and q voltage control signals that implement the final control action.

Figure 3:
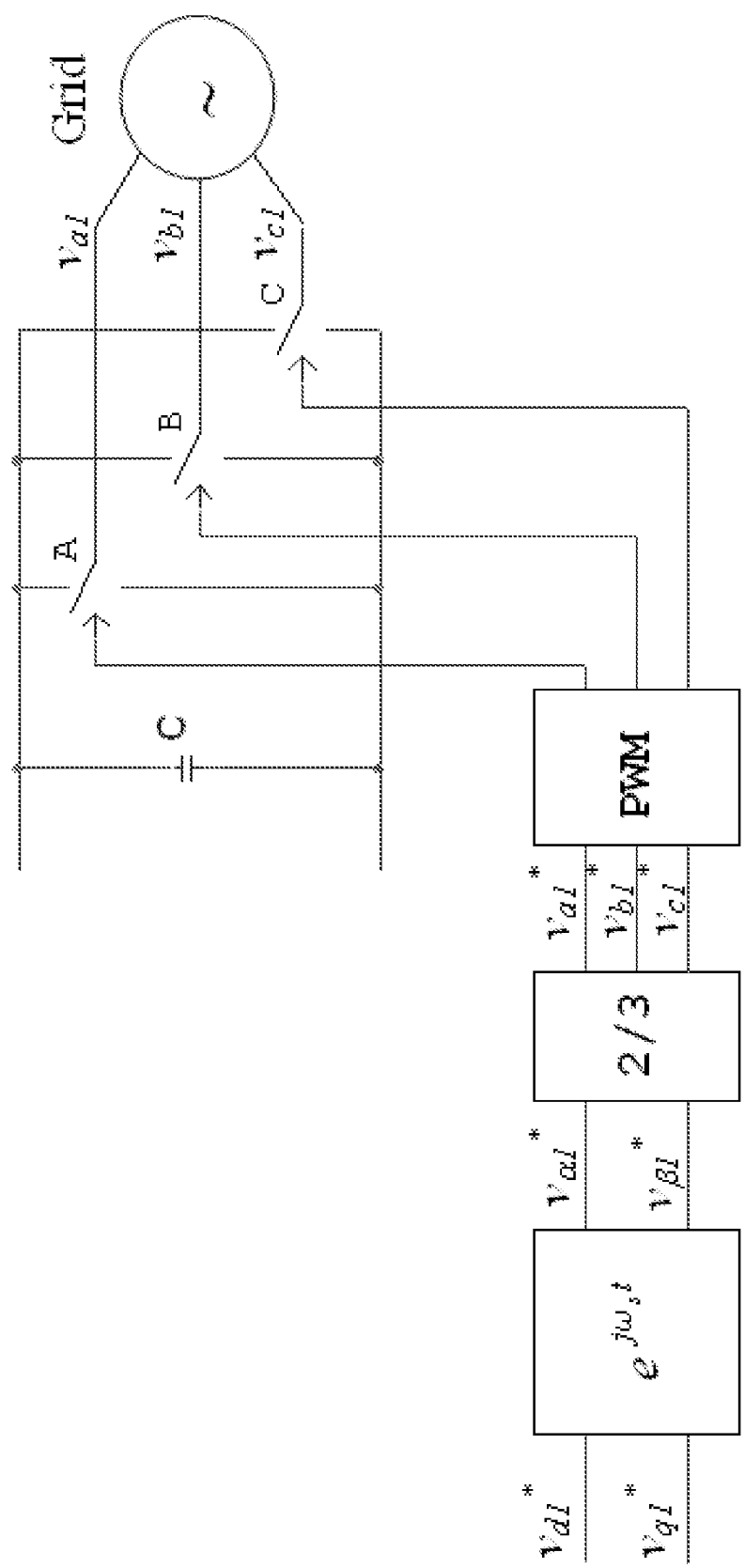
FIG. 3 illustrates an embodiment of a general strategy for transformation from the d and q signals to the three-phase sinusoidal signal, in which the d and q reference voltages, $v_{d1}^*$ and $v_{q1}^*$, represents the d and q voltage control signals from an embodiment of the controller (FIG. 2)

The control signal applied directly to the front-end converter is a three-phase sinusoidal voltage having the grid frequency. The general strategy for transformation from the d and q signals to the three-phase sinusoidal signal is illustrated in FIG. 3, in which the d and q reference voltages, $v_{d1}^*$ and $v_{q1}^*$, represents the d and q voltage control signals from the controller (FIG. 2). The α and β reference voltages, $v_{\alpha 1}$ and $v_{\beta 1}$, are obtained from the d-q reference voltages through a vector rotation of $e^{j\omega_s t}$, where $\omega_s$ represents the grid frequency. The two α and β voltages together are then used to generate a three-phase sinusoidal reference voltage, $v_{a1}^*$, $v_{b1}^*$, and $v_{c1}^*$, to control the front-end PWM converter. From a converter-average model point of view, this three-phase reference voltage results in a three-phase sinusoidal voltage, $v_{a1}$, $v_{b1}$, and $v_{c1}$, injected into the grid. The injected voltage is linearly proportional to the three-phase sinusoidal reference voltage, $v_{a1}^*$, $v_{b1}^*$, and $v_{c1}^*$, in the converter linear modulation mode. The gain between the two is $k_{PWM}=V_{dc}/(2\hat{V}_{tri})$, where $V_{dc}$ is the DC link voltage, and $\hat{V}_{tri}$ is the amplitude of the bipolar triangle carrier waveform.

Front-End Converter Model in D-Q Reference Frame

Figure 4:
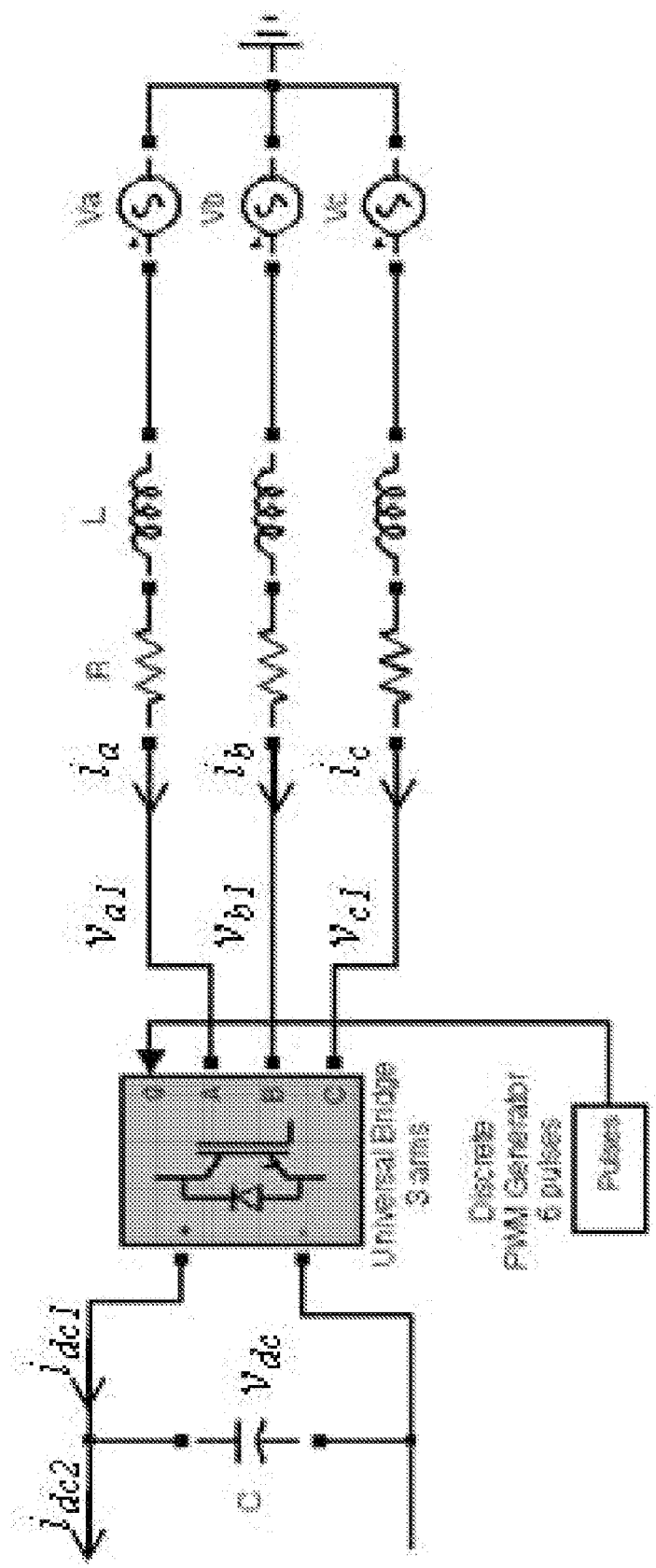
FIG. 4 illustrates a schematic of an embodiment of a front-end converter system.

FIG. 4 shows a schematic of a front-end converter system. In the figure, a DC-link capacitor is on the left and a three-phase grid voltage is on the right. The voltage balance across the inductors (grid filter) is:

$$\begin{bmatrix} v_a \\ v_b \\ v_c \end{bmatrix} = R \begin{bmatrix} i_a \\ i_b \\ i_c \end{bmatrix} + L \frac{d}{dt} \begin{bmatrix} i_a \\ i_b \\ i_c \end{bmatrix} + \begin{bmatrix} v_{a1} \\ v_{b1} \\ v_{c1} \end{bmatrix} \qquad (1)$$

where L and R are the line inductance and resistance of the transformer or the grid filter. When transforming Eq. (1) to the d-q reference frame that has the same speed as that of the grid voltage, Eq. (1) becomes Eq. (2), where $\omega_s$ is the angular frequency of the grid voltage.

$$\begin{bmatrix} v_d \\ v_q \end{bmatrix} = R \begin{bmatrix} i_d \\ i_q \end{bmatrix} + L \frac{d}{dt} \begin{bmatrix} i_d \\ i_q \end{bmatrix} + \omega_s L \begin{bmatrix} -i_q \\ i_d \end{bmatrix} + \begin{bmatrix} v_{d1} \\ v_{q1} \end{bmatrix} \qquad (2)$$

Equation (2) can be expressed by a complex Eq. (3) using space vectors in which $\vec{v}_{dq}$, $\vec{i}_{dq}$, and $\vec{v}_{dq1}$ are space vectors of grid voltage, line current, and converter output voltage.

$$\vec{v}_{dq} = R \cdot \vec{i}_{dq} + L\frac{d}{dt}\vec{i}_{dq} + j\omega_s L \cdot \vec{i}_{dq} + \vec{v}_{dq1} \tag{3}$$

$$\vec{V}_{dq} = R \cdot \vec{I}_{dq} + j\omega_s L \cdot \vec{I}_{dq} + \vec{V}_{dq1} \tag{4}$$

Figure 5:
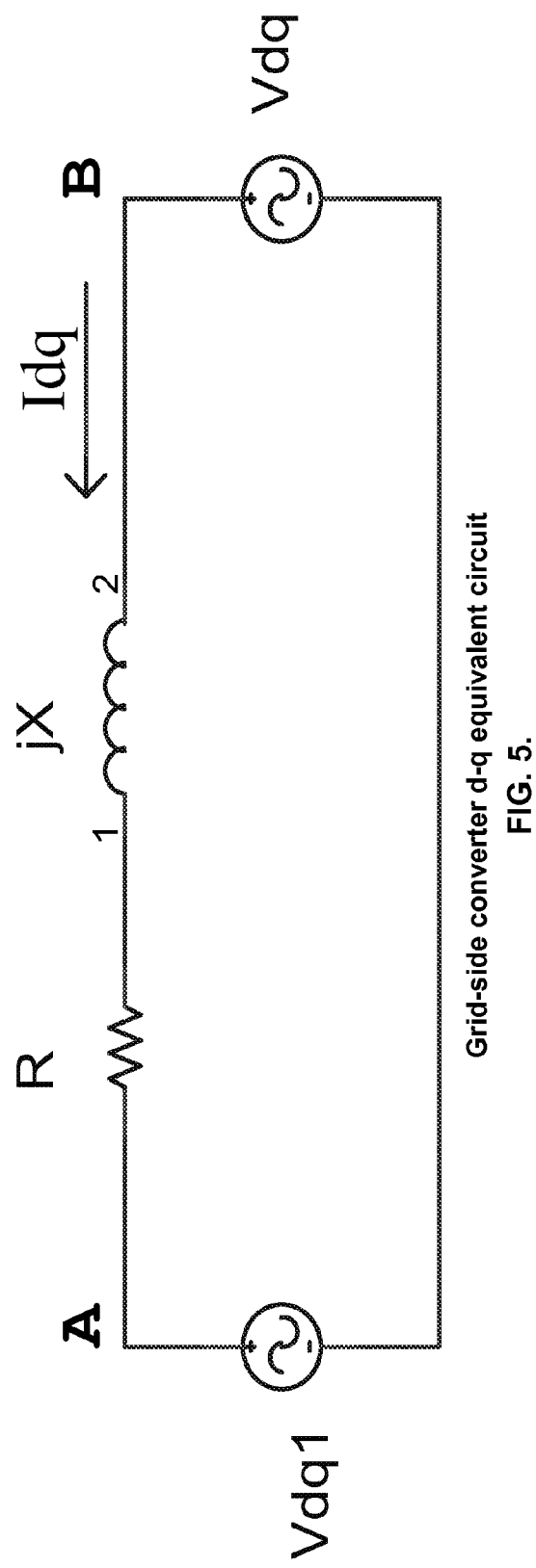
FIG. 5 illustrates an embodiment of a d-q steady-state equivalent circuit of an embodiment of a front-end converter system in a d-q reference frame results.

In a steady-state condition, Eq. (3) becomes Eq. (4), from which a d-q steady-state equivalent circuit of the front-end converter system in a d-q reference frame results, as shown by FIG. 5. In the figure, the converter injects a d-q voltage $\vec{V}_{dq1}$ into the grid. The d and q components of the injected voltage, $V_{d1}$ and $V_{q1}$, are linearly proportional to the d and q control reference voltages $V_{d1}^*$ and $V_{q1}^*$ according to FIG. 3.

A decoupled d-q vector control approach depends on where the d or q axis is aligned. The general approach used in controller design of the front-end converter is a grid voltage orientation frame, in which the d-axis of the reference frame is aligned along the grid voltage position. Assuming that the grid voltage is constant, then, the grid d-axis voltage is constant and the q-axis voltage is zero. Therefore, the instantaneous active and reactive powers absorbed from the grid by the converter are proportional to the d- and q-axis currents, respectively, as shown by Equations (5) and (6).

$$p(t) = v_d i_d + v_q i_q = v_d i_d \tag{5}$$

$$q(t) = v_q i_d - v_d i_q = -v_d i_q \tag{6}$$

In terms of the steady state equivalent circuit of FIG. 5, $\vec{V}_{dq} = V_d + j0$ if the d-axis of the reference frame is aligned along the grid-voltage position. Assuming $\vec{V}_{dq1} = V_{d1} + jV_{q1}$ and neglecting the filter resistance, then, the current flowing between the grid and the converter can be obtained by $$\vec{I}_{dq} = \frac{\vec{V}_{dq} - \vec{V}_{dq1}}{R + jX_L} = \frac{V_d - V_{d1} - jV_{q1}}{R + jX_L} \tag{7}$$

in which $X_L$ stands for the line and filter reactance.

If passive sign convention is applied, i.e., power flowing toward the converter as positive, then, the power absorbed from the grid by the converter can be achieved from the fundamental complex power equation, i.e., $P_g + jQ_g = \vec{V}_{dq} \vec{I}_{dq}^* = V_d \vec{I}_{dq}^*$. By solving this power equation together with Equation (7), Equations (8) and (9) can be obtained:

$$P_g = V_d \cdot [(V_d - V_{d1})R - V_{q1}X_L]/(R^2 + X_L^2) \tag{8}$$

$$Q_g = V_d \cdot [(V_d - V_{d1})X_L + V_{q1}R]/(R^2 + X_L^2) \tag{9}$$

If neglecting the grid filter resistance, the real and reactive powers are simplified into Eq. (10) and are controllable only through q- and d-axis reference voltages, respectively.

$$P_g = -\frac{V_d V_{q1}}{X_L}, \quad Q_g = \frac{V_d}{X_L}(V_d - V_{d1}) \tag{10}$$

Power Control Characteristics of Front-End Converter Under D-Q Vector Control

For effective controller design and analysis, it is valuable to examine the power control characteristics of the front-end converter. According to Equation (10), the power absorbed by the converter from the grid depends on the d and q components of the injected voltage $\vec{v}_{dq1}$. To maintain a constant DC-link voltage, the power passed to the DC link capacitor from a renewable energy source should equal to the power transferred to the grid from the front-end converter when neglecting converter losses. Thus, the DC link voltage control is actually realized through the real power balance control between the input and output real power to and from the AC/DC/AC converter.

The power control characteristics of the front-end converter are investigated through computer simulation based on FIG. 5. Under a decoupled d-q control condition, the real and reactive powers absorbed by the front-end converter from the grid are affected by both $V_{d1}$ and $V_{q1}$. On another aspect, the converter should operate within its rated current/power (see Equation (11)) where $I_{rated}$ is the rated per-phase rms current; and the converter linear modulation requires that the amplitude of the converter injected voltage to the grid, $V_{conv}$, does not exceed the maximum allowable converter output voltage as shown by Equation (12) where $V_{conv}$ is the per-phase rms voltage of the injected voltage, $V_{dc}$ is the DC link capacitor voltage, and $m_a$ ($m_a \leq 1$) is amplitude modulation ratio of the converter.

$$\sqrt{\frac{(I_d^2 + I_q^2)}{3}} \leq I_{rated} \tag{11}$$

$$V_{conv} = \sqrt{\frac{V_{d1}^2 + V_{q1}^2}{3}} = \frac{m_a V_{dc}}{2\sqrt{2}\,\hat{V}_{tri}} \leq \frac{V_{dc}}{2\sqrt{2}\,\hat{V}_{tri}} \tag{12}$$

Figure 6B:
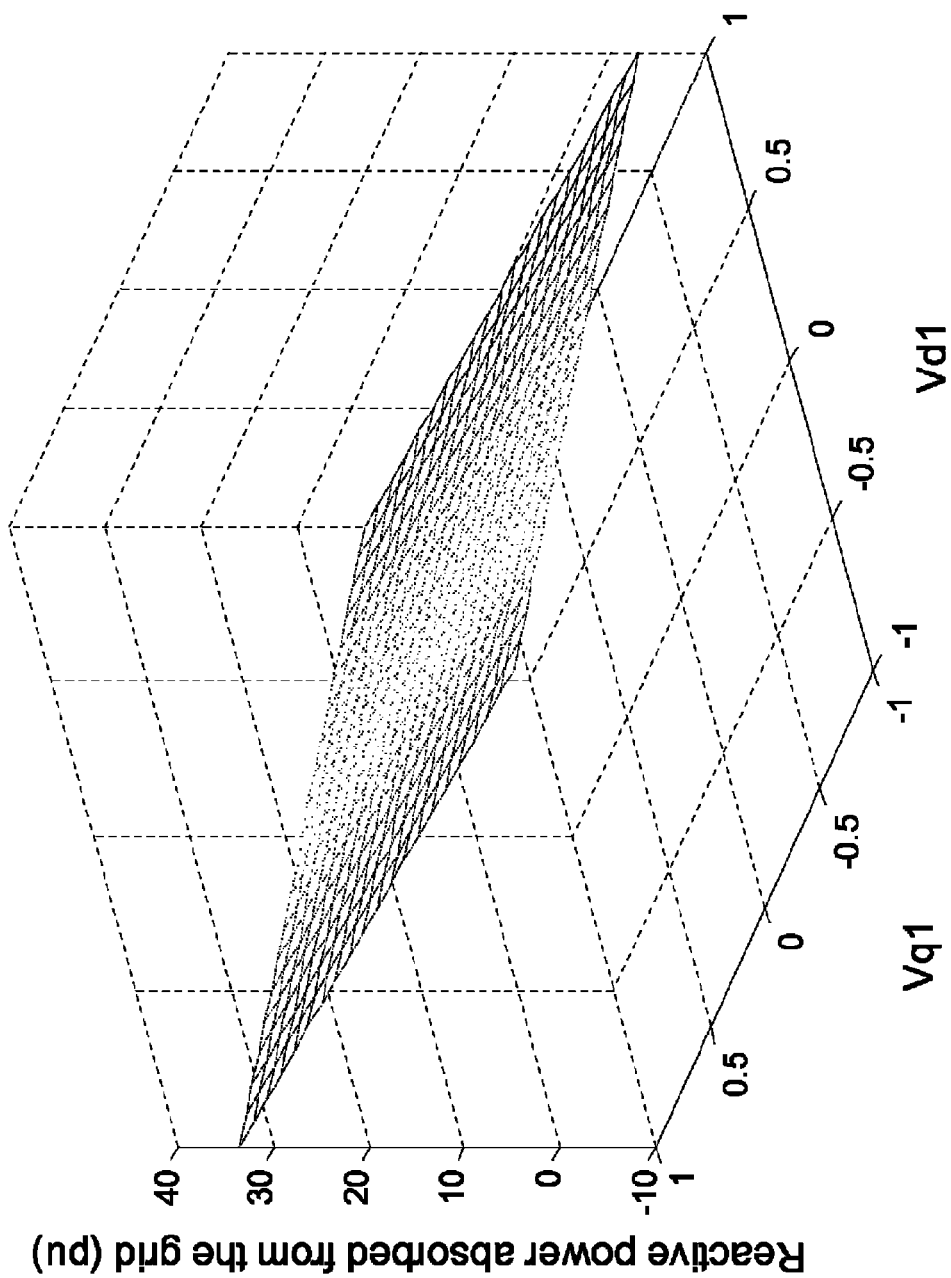
Figure 6C:
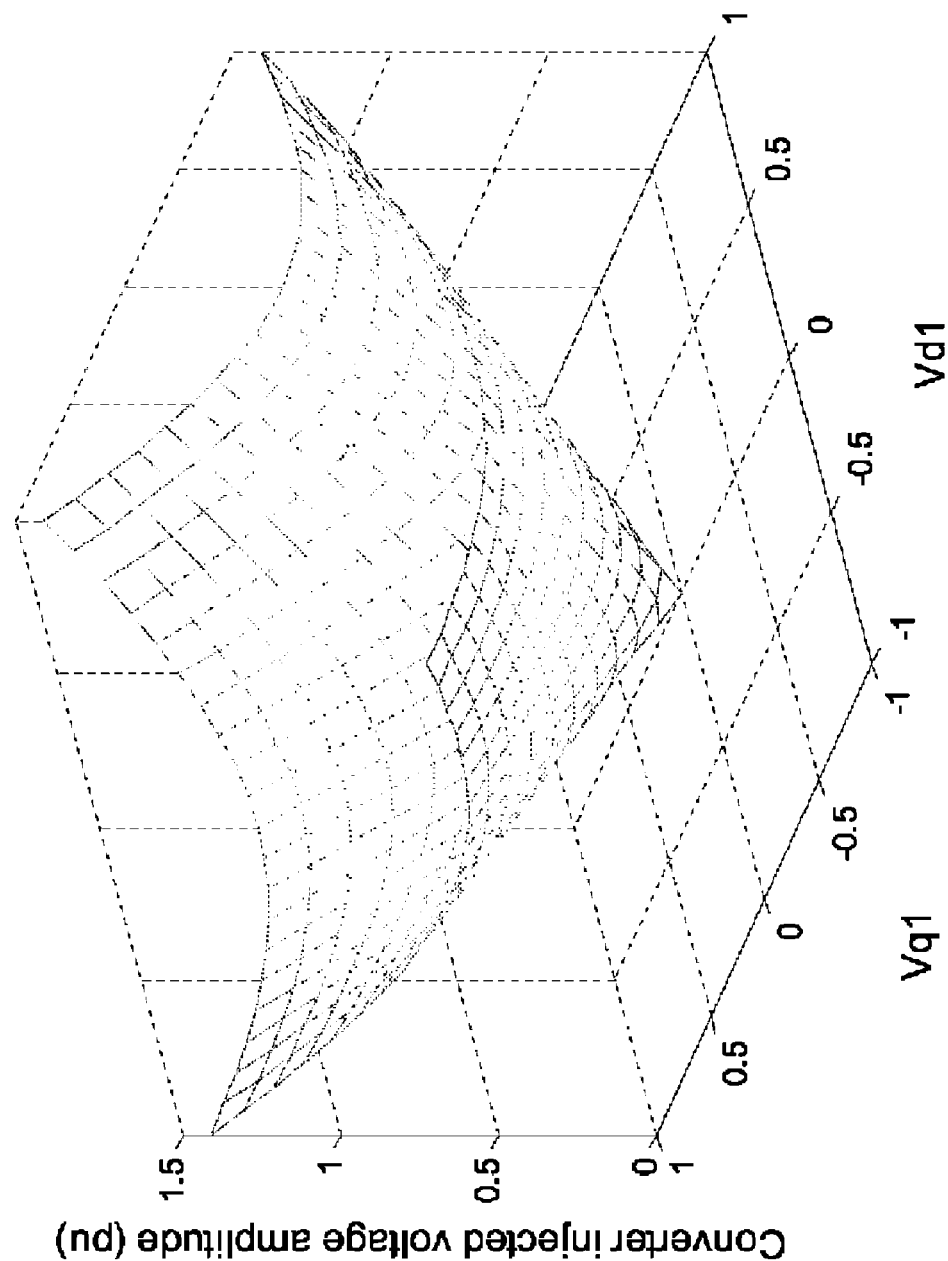

FIGS. 6A-6C show the power control characteristics of the front-end converter under a combined $V_{d1}$ and $V_{q1}$ control in a 3D domain for a typical per-unit impedance value of the grid filter. It also shows the amplitude of the converter injected voltage, on the grid side, versus $V_{d1}$ and $V_{q1}$. FIG. 6A reveals a general parabolic relationship of the real power absorbed by the front-end converter versus $V_{d1}$ and $V_{q1}$ and FIG. 6B indicates a linear relationship of reactive power absorbed by the converter from the grid, which indicates that $V_{q1}$ is more effective for real power control (FIG. 6A) and $V_{d1}$ is more effective for reactive power control (FIG. 6B). According to FIG. 6A, increasing $V_{q1}$ from −1 to +1 changes the real power from absorbing to generating. According to FIG. 6B, increasing $V_{d1}$ from −1 to +1 changes the reactive power from absorbing to generating. The more positive $V_{d1}$ is and the more negative $V_{q1}$ is, the smaller the reactive power is absorbed from the grid by the converter. When considering real power balancing and converter linear modulation requirement (Equation (12)), the maximum allowable values for $V_{d1}$ and/or $V_{q1}$ are even smaller so that the reactive power absorbed from the grid may be high if the DC link capacitor voltage is low.

Conventional Control Mechanism of the Front-End Converter

The traditional control approach of the front-end converter is usually a nested-loop controller consisting of an inner current control loop and an outer DC link voltage control loop (reference FIG. 2). The voltage control loop adjusts the d-axis current reference $i_d^*$ depending on the difference between the desired and actual DC link capacitor voltages. The inner current control loop assures that the d-axis component of the actual current reaches the d-axis current reference $i_d^*$ and the q-axis component of the actual current reaches a q-axis current reference $i_q^*$ which is also equivalent to regulating measured real and reactive power to meet a real and reactive power need according to Equations (5) and (6).

A. Inner Current Control Loop

Figure 7:
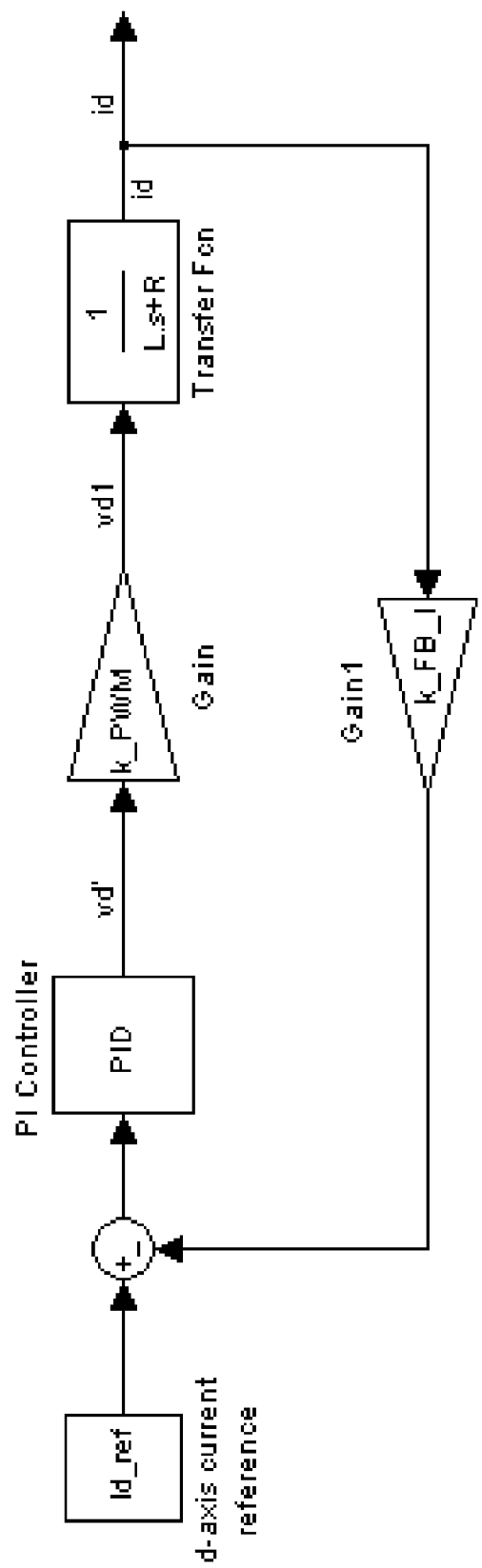
FIG. 7 is a block diagram of an embodiment of a current-loop controller in which $1/(L \cdot s+R)$ represents plant transfer function for d and q current loop, $k_{PWM}$ is the gain of the power electronic converter, $k_{FB\_I}$ is a gain of the current feedback path such as a gain from a current sensor, and the PID block stands for a d- or q-loop current controller.

The present control strategy of the conventional decoupled d-q current control is usually developed by re-writing Equation (2) as $$v_{d1} = -\left(Ri_d + L\frac{di_d}{dt}\right) + \omega_s L i_q + v_d \quad (13)$$

$$v_{q1} = -\left(Ri_q + L\frac{di_q}{dt}\right) - \omega_s L i_d \quad (14)$$

in which the item in the bracket of Equations (13) and (14) is treated as the state equation between the voltage and current for d and q loops, and the other items are treated as compensation or disturbance items. Thus, the current-loop controller design of traditional approaches is developed based on a system block diagram as shown by FIG. 7, in which 1/(L·s+R) represents plant transfer function for d and q current loop, $k_{PWM}$ is the gain of the power electronic converter (see FIG. 3), $k_{FB\_I}$ is a gain of the current feedback path such as a gain from a current sensor, and the PID block stands for a d- or q-loop current controller. To design a controller, either root locus or frequency response techniques can be used.

B. DC Link Voltage Control

The DC link voltage control is developed based on the principle of the power balance equation (Equation (15)) between the AC and DC sides of the front-end converter. In Equation (15), losses of the grid-side filter and converter are neglected; thus, errors may be resulted in the controller design. As the d axis of the reference frame is aligned along the grid voltage position, Equation (16) is obtained, where $v_{dc}$, $i_{dc1}$, and $i_{dc2}$ are the DC capacitor voltage and currents as shown in FIG. 4. Since $i_{dc2}$ is an unknown, simplification of Equation (16) was employed traditionally by either neglecting $i_{dc2}$ or by linearization of the model around a chosen operating point. Both methods may generate additional errors because pre-selected values for $i_{dc2}$ and/or $i_d$ cannot reflect the variable operating condition of the capacitor and the converter.

$$v_{dc} i_{dc1} = v_d i_d + v_q i_q \quad (15)$$

$$v_{dc}\left(C\frac{dv_{dc}}{dt} + i_{dc2}\right) = v_d i_d \rightarrow \frac{dv_{dc}}{dt} = \frac{v_d i_d}{v_{dc} C} - \frac{i_{dc2}}{C} \quad (16)$$

Figure 8:
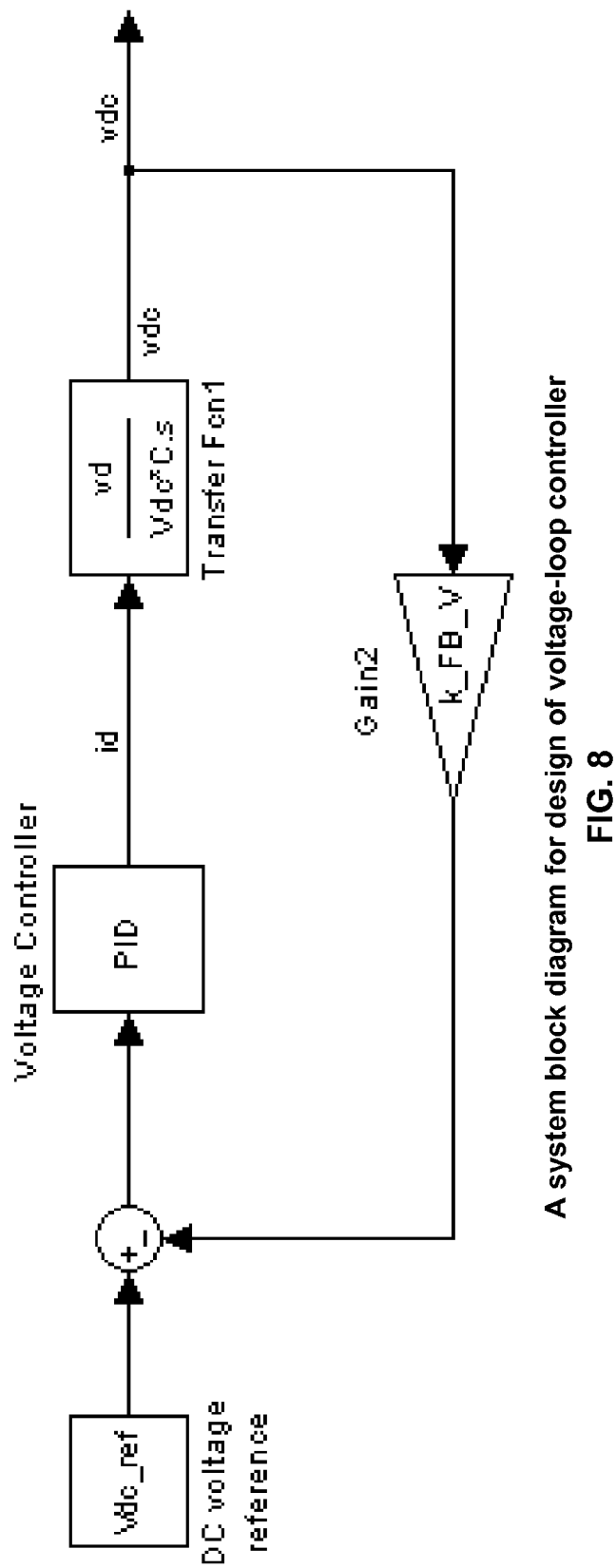
FIG. 8 illustrates a block diagram of an embodiment of a voltage-loop controller in which the current loop is assumed ideal, $V_d/(V_{dc}C \cdot s)$ represents plant transfer function of the DC link voltage loop, $k_{FB\_V}$ is a gain of the voltage feedback path such as a gain of the voltage sensor, and the PID block stands for a voltage PID controller.

Assuming $i_{dc2}$ is neglected, then, a system block diagram as shown by FIG. 8 results, in which the current loop is assumed ideal, $V_d/(V_{dc}C·s)$ represents plant transfer function of the DC link voltage loop, $k_{FB\_V}$ is a gain of the voltage feedback path such as a gain of the voltage sensor, and the PID block stands for a voltage PID controller, as known in the art.

Figure 9:
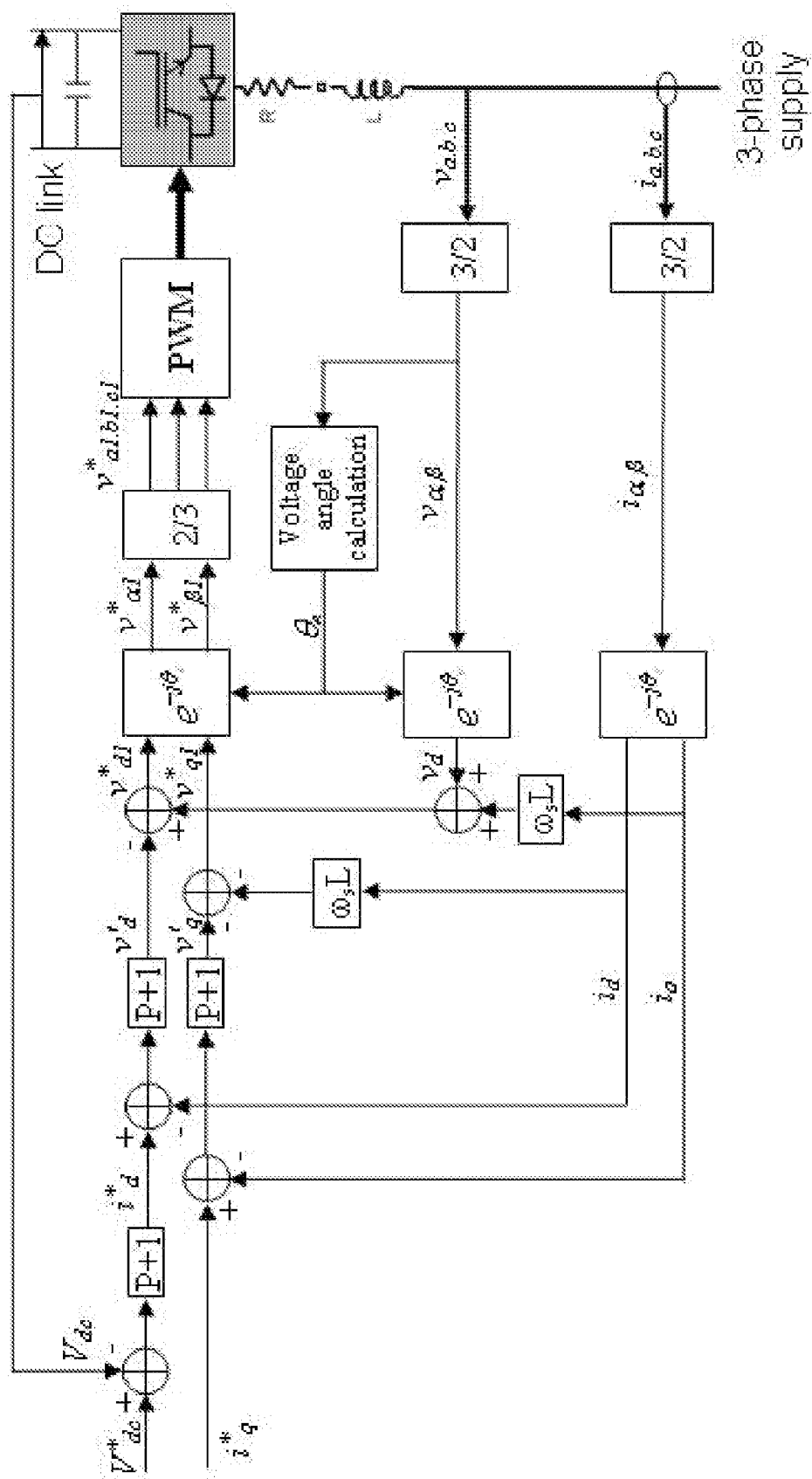
FIG. 9 illustrates an embodiment of an overall conventional d-q control structure.

An embodiment of an overall conventional d-q control structure is shown by FIG. 9. The control scheme utilizes current control loops for $i_d$ and $i_q$, with the $i_d$ demand being derived from the DC-link voltage error through a standard PI controller. The $i_q$ demand determines the reactive power absorbed from the grid. The d-q current control is implemented indirectly through a current-regulated voltage-source PWM converter scheme. The d and q reference voltages $v_{d1}^*$ and $v_{q1}^*$, are the d and q voltages $v_d'$ and $v_q'$ from the current-loop controllers plus the compensation items as shown in Equations (17) and (18). The two reference voltages are used to generate the three-phase sinusoidal reference voltage, $v_{a1}^*$, $v_{b1}^*$, and $v_{c1}^*$, to control the front-end PWM converter (see FIGS. 3 and 10). Therefore, this embodiment of a current-loop control structure actually regulates $i_d$ and $i_q$ (i.e., grid real and reactive power) through the controller output voltages, $v_d'$ and $v_q'$, respectively. But, as described above and according to Equation (10), d-axis voltage is only effective for reactive power or $i_q$ control, and q-axis voltage is only effective for real power or $i_d$ control. Therefore, control of d- and q-axis currents relies mainly on the compensation items in both d and q current loops. However, those compensation items are not contributed in a feedback control principle and concept.

$$v_{d1} = -v_d' + \omega_s L i_q + v_d \quad (17)$$

$$v_{q1}^* = -v_q' - \omega_s L i_d \quad (18)$$

Figure 10:
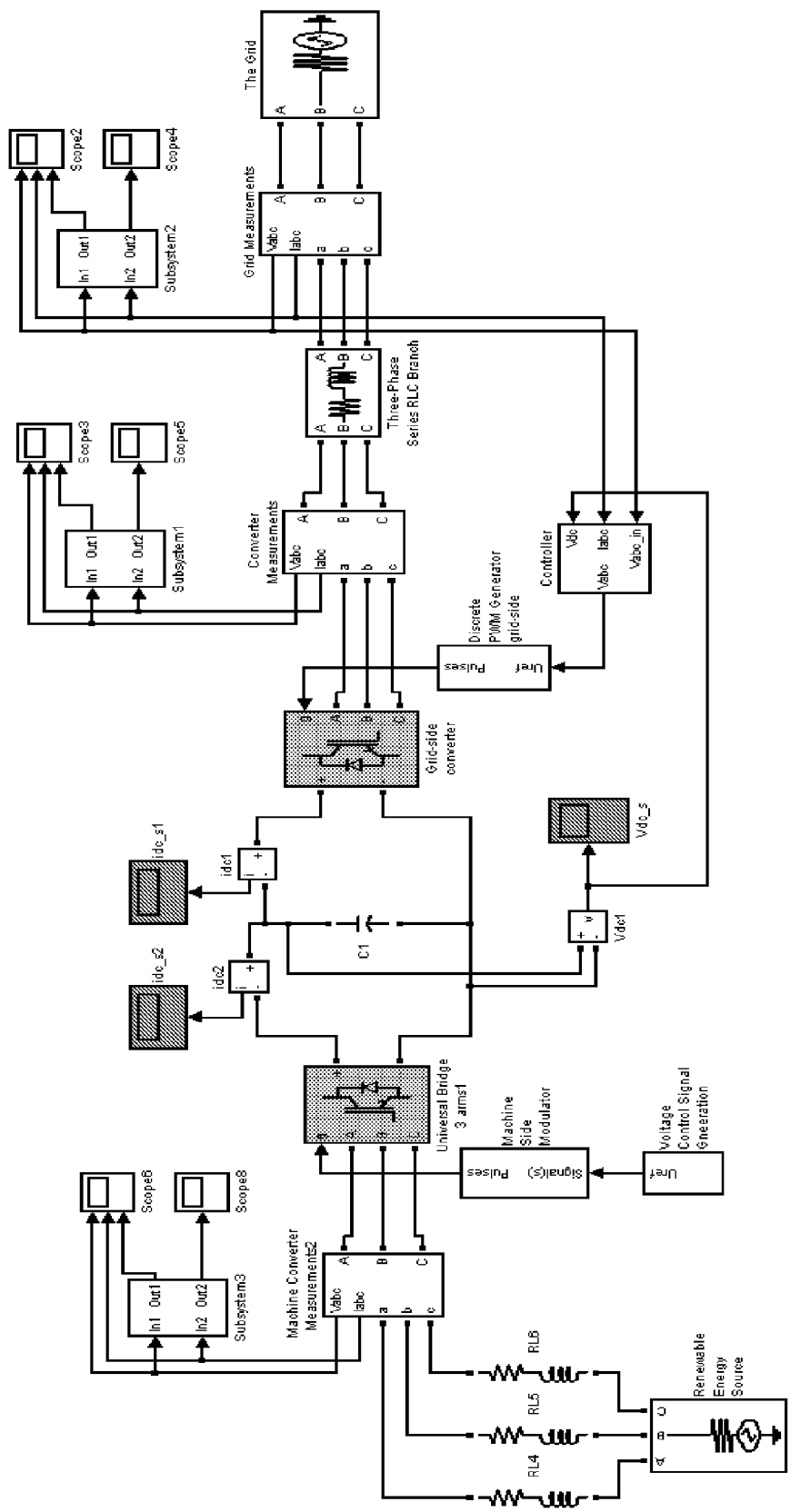
FIG. 10 illustrates an embodiment of an integrated transient simulation system with feedback control.

To assess the performance of the traditional d-q control approach, current- and voltage-loop PI controllers are designed and evaluated for the following exemplary system data that includes: 1) a 1500V DC voltage set value, 2) a three-phase 60 Hz, 690V line-line AC voltage source, 3) a three-phase PWM converter with a frequency modulation ratio of 30, i.e., a switching frequency of 1800 Hz, and 4) a grid filter with a resistance of 0.0012Ω and an inductance of 2 mH. The frequency response technique is used in the controller design. The crossover frequency of the current-loop controller is one or two orders smaller than the switching frequency, the voltage-loop controller is one or two orders smaller than the current-loop cutoff frequency, and the phase margin for both loops is 60°. An embodiment of an integrated transient simulation system with the feedback control is shown by FIG. 10. A normalization saturation mechanism can be applied to voltages $v_{d1}^*$ and $v_{q1}^*$ if the amplitude of the reference voltage exceeds the converter linear modulation limit.

FIGS. 11A-11D demonstrate performance of the traditional d-q control approach for a constant DC link voltage reference at, for example, 1500V and a changeable reactive power reference. Assume an initial capacitor voltage of 2000V. The initial reactive power reference is 100 kVar, i.e., a condition that the reactive power is absorbed by the converter from the grid. At t=1.5 s, there is a condition change on the source side, causing more real power absorbed by the renewable energy source from the DC link capacitor. At t=3 s, the reactive power reference changes from 100 kVar to −50 kVar, i.e., a condition that the reactive power is generating.

Figure 11C:
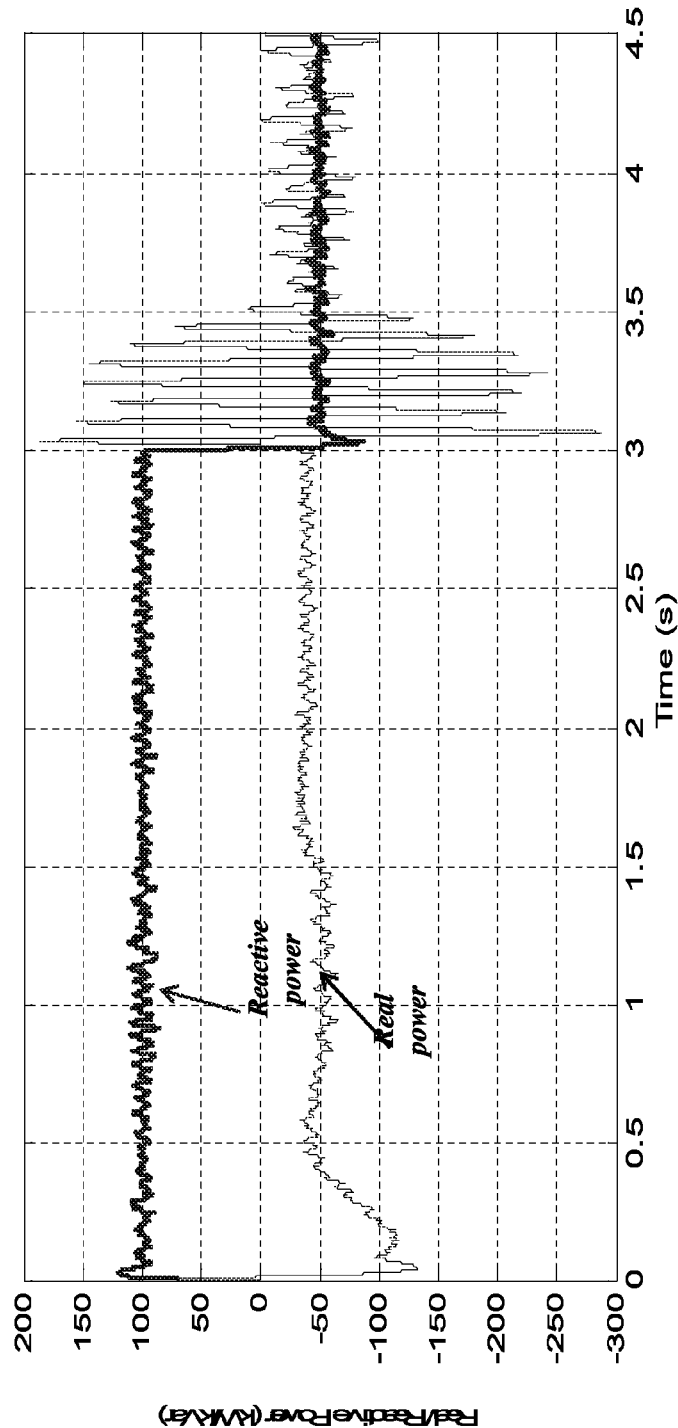

As can be seen from FIG. 11A, the effectiveness of the DC link voltage control using the traditional approaches depends on the reactive power reference and the real power passed from a renewable source to the DC link capacitor. Normally, if the reactive power reference is more positive (absorbing), the converter tends to operate more in its linear modulation region (Equation (17)) and the DC link voltage is less oscillated around the target value. For a condition change on the source side at t=1.5 s as shown in FIG. 11A, the controller drags the measured DC link voltage back to the target value effectively. However, if the reactive power reference is more negative (generating), the converter is easier to get into or operate in the nonlinear modulation region before an applied saturation operation and the DC link voltage oscillates more around or away from a target value. The measured d- and q-axis currents always fluctuate around the targeted d and q currents using the traditional control mechanisms (reference FIG. 11B). Since the q current reference is constant and the d current reference changes with the error between measured and targeted DC link voltages, the actual q-axis current is more stable while the oscillation of the d-axis current depends on both the reactive power reference and the real power passed from a renewable source to the grid through the converter. Therefore, actual reactive power is more stable than real power (reference FIG. 11C). Periodic unbalance currents also may occur at the grid side.

Intelligent Control of Front-End Converter

The theoretical foundation of a proposed intelligent control technology is derived from Equations (5) and (6), i.e., using d- and q-axis currents for real and reactive power control of the front-end converter, respectively. But, instead of generating a d- or q-axis voltage based on a d- or q-axis current error signal as shown by the conventional control structure (reference FIG. 10), the intelligent control structure outputs a current signal at the d or q current loop of the controller. The d and q current signals $i_d'$ and $i_q'$ generated by the controllers are then used to compute d and q reference voltages $v_{d1}^*$ and $v_{q1}^*$ according to Equations (19) and (20), which is equivalent to the transient d-q equation (3) after being processed by a low pass filter for the purpose to reduce the high oscillation of d and q reference voltages applied directly to the converter.

$$v_{d1}^* = -Ri_d' + \omega_s Li_q' + v_d \quad (19)$$

$$v_{q1}^* = -Ri_q' - \omega_s Li_d' \quad (20)$$

Figure 12A:
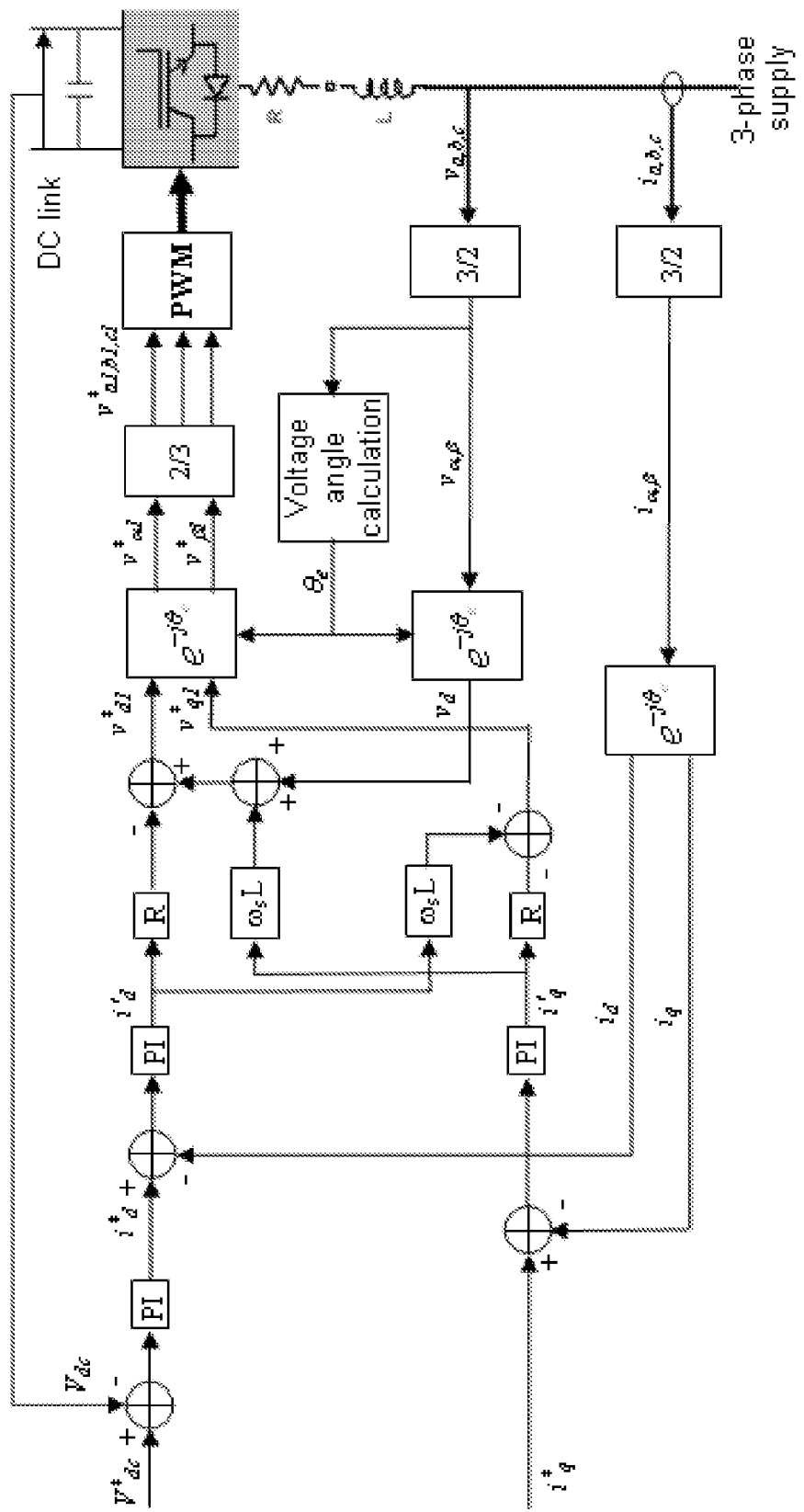
FIG. 12A illustrates an embodiment of an embodiment of a control structure for a system which is comprised of a d-axis current loop for DC link voltage or real power control and a q-axis current loop for reactive power control.
Figure 12B:
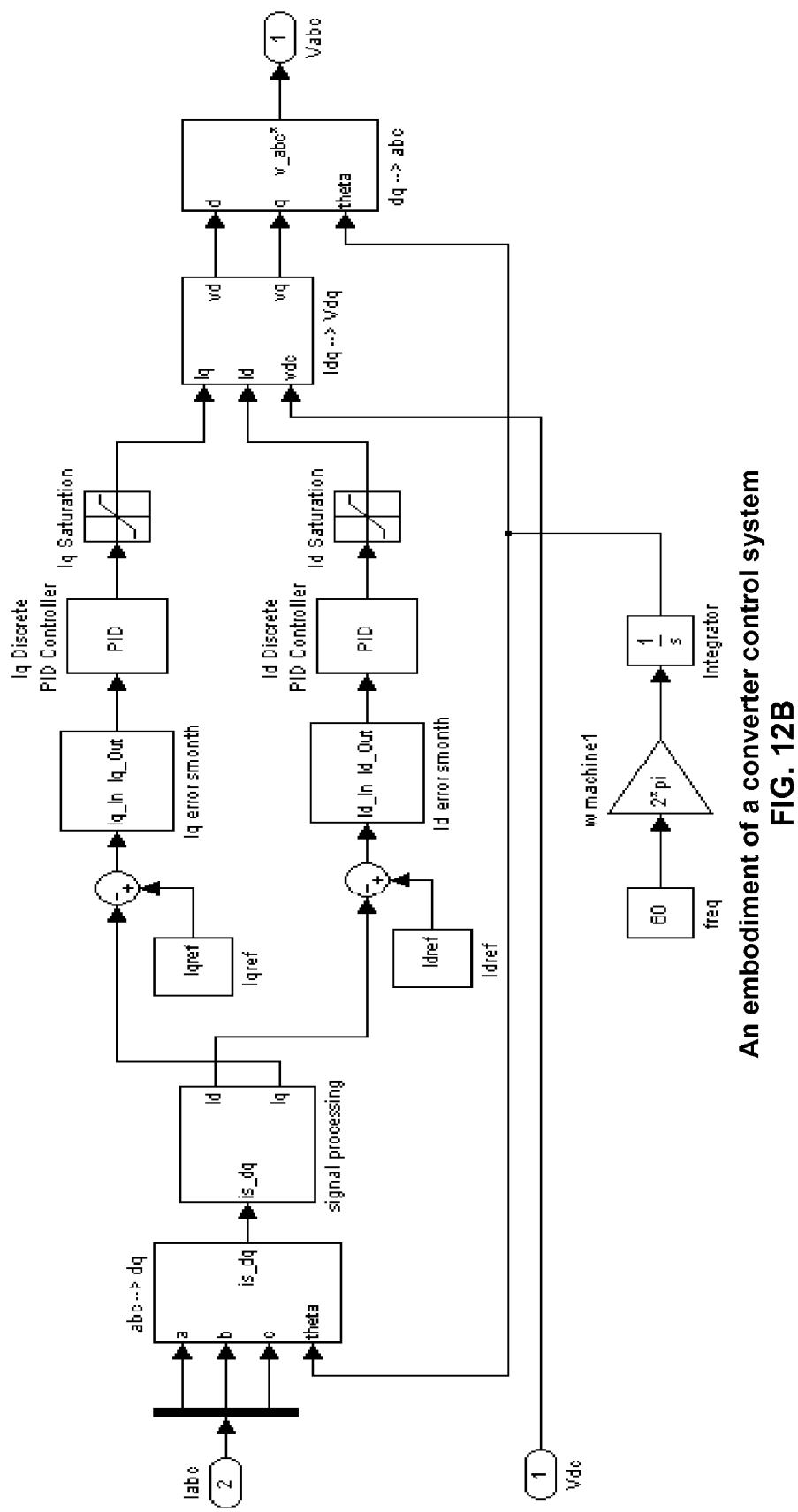
FIG. 12B illustrates an embodiment of a block diagram of the control system of FIG. 12A.

An embodiment of a control structure for a system is shown by FIG. 12A, which is comprised of a d-axis current loop for DC link voltage or real power control and a q-axis current loop for reactive power control. The d-axis current reference is generated through the DC link voltage controller. Signal processing technology is applied to the measured DC link voltage and d- and q-axis currents to prevent the high order harmonics of the measured DC link voltage and d- and q-axis currents from entering the controllers. A sigmoid function (Equation (21)), similar to the activation functions generally employed in artificial neural networks, is placed between the error signals and the controllers to reduce extreme unbalance influences that may be generated during control transitions. Both the voltage and current controllers are operated on a mechanism that integrates HD, fuzzy and adaptive control technologies. The PID parts of the voltage and current controllers operate on a direct target control principle. The fuzzy and adaptive parts of the controllers adjust the PID parameters based on the difference between the measured and reference target values. A block diagram of the control system of FIG. 12A is shown in FIG. 12B.

$$\phi(I_{error}) = k(e^{I_{error}} - e^{-I_{error}})/(e^{I_{error}} + e^{-I_{error}}) \quad (21)$$

A saturation function is applied to each of the d and q current control loops to prevent both d and q currents from exceeding the rated converter current. In addition, a nonlinear programming formulation as shown below is developed to prevent the resultant d-q current from going over the converter rated current and to prevent the converter from getting into a nonlinear modulation mode. The basic principle of the nonlinear programming formulation is that under the converter rated power and linear modulation constraints, the system should be operated to meet the real power control goal while minimize the difference between the reference and actual reactive power. For example, if the resultant d-q current is over the converter rated current, $i_q'$ from the q current control loop will be modified so that the resultant current is not over the converter rated current. Note that this nonlinear programming strategy is much easier to implement in the intelligent control structure (reference FIG. 12A) than the traditional control structure (reference FIG. 9).

Minimize $|Q_{actual} - Q_{ref}|$ $P_{actual} = P_{ref}$

Figure 13A:
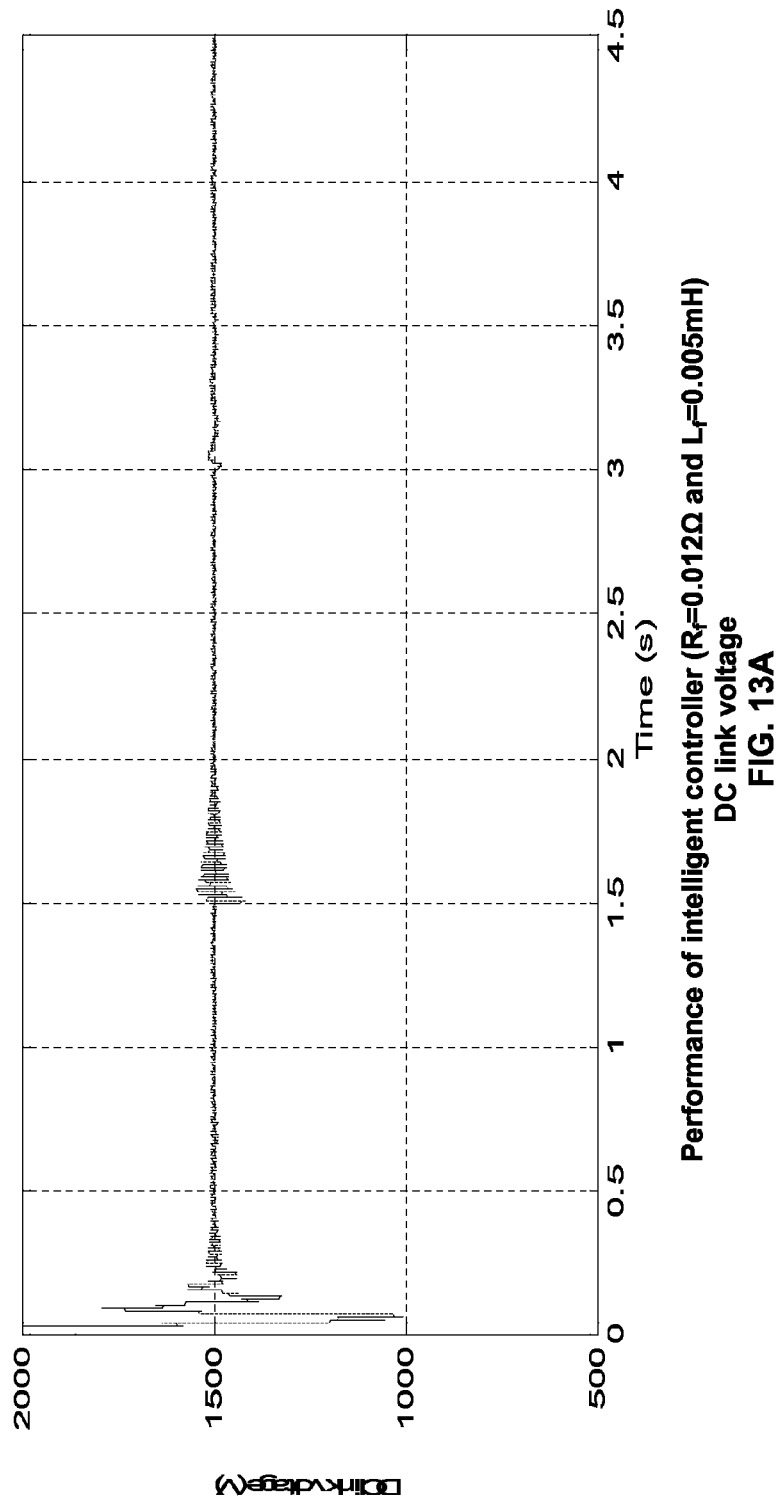
FIG. 13A illustrates that shortly after the start of the system, the controller regulates the DC link voltage to the voltage references.
Figure 13B:
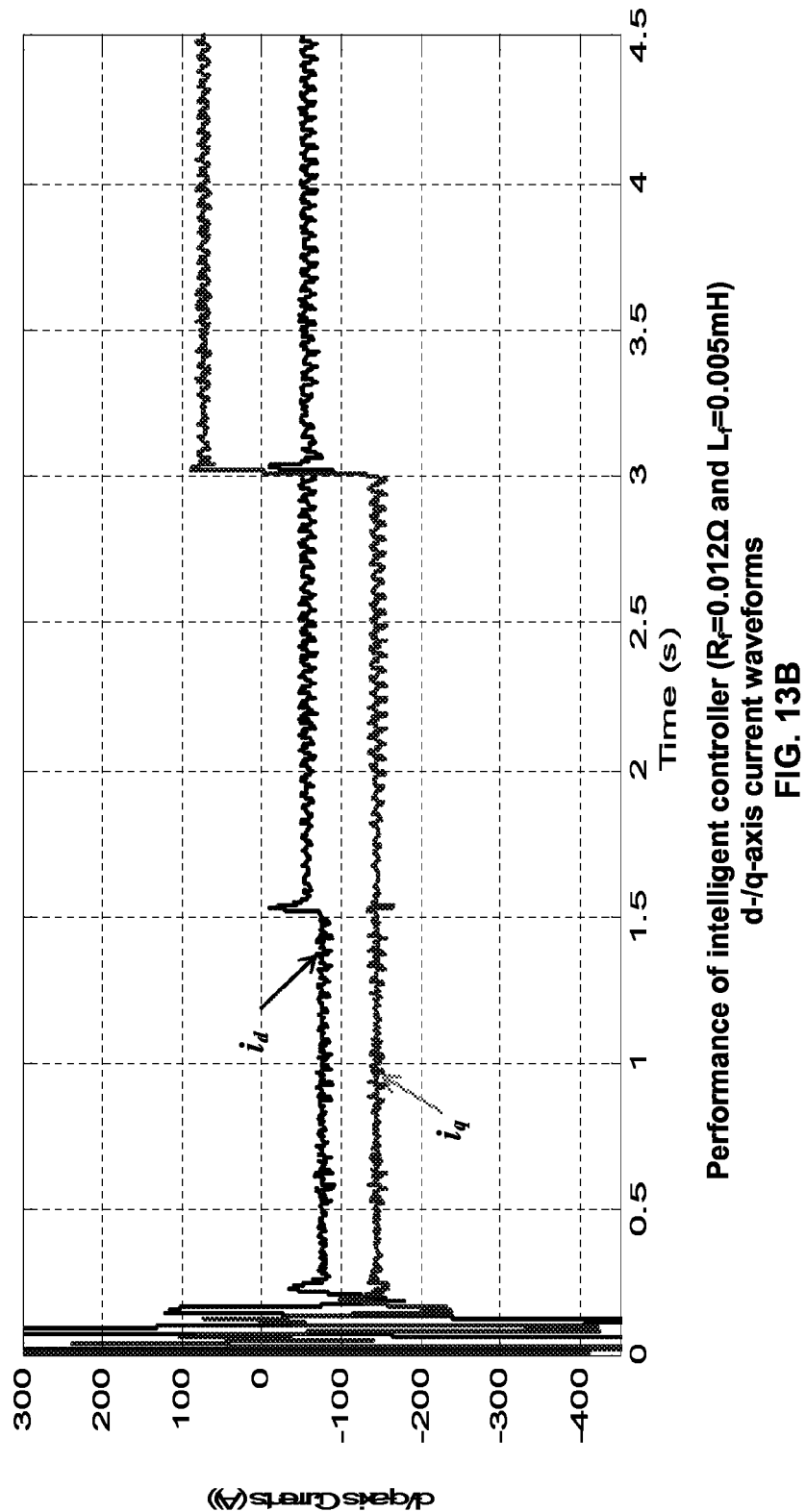
FIG. 13B illustrates performance of an embodiment of the current loop controllers.
Figure 13D:
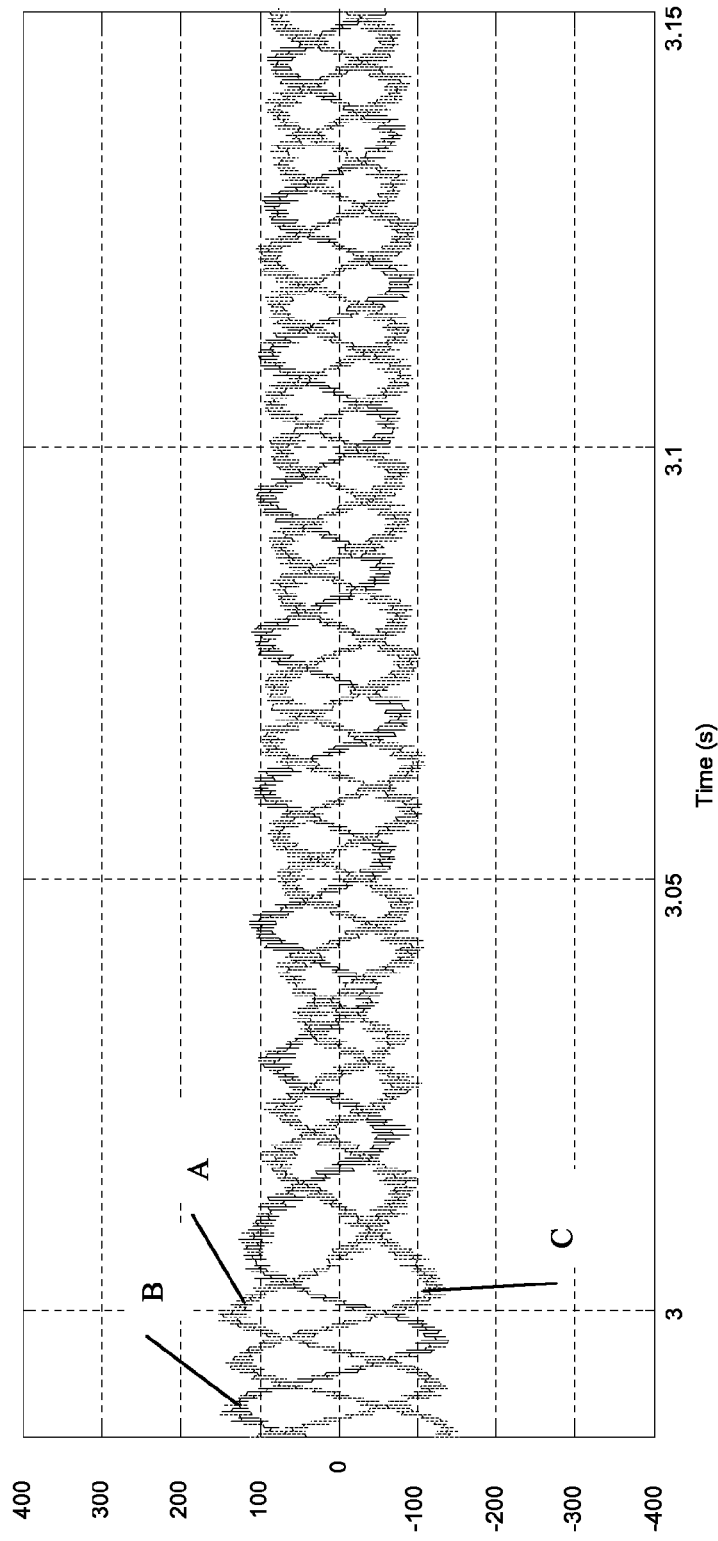
FIG. 13D illustrates the three-phase current waveform during a control transition.

Subject to: $\sqrt{\frac{I_d^2 + I_q^2}{3}} \leq I_{rated}$, $V_{conv} = \sqrt{\frac{V_{d1}^2 + V_{q1}^2}{3}} \leq \frac{V_{dc}}{2\sqrt{2}\hat{V}_{tri}}$ The performance of the intelligent control approach is evaluated for the same condition used in FIGS. 11A-11D. In other words, for the system configuration of FIG. 10, except for the controller block that is replaced by an intelligent control structure (reference FIG. 12A), all the other components remain unchanged. FIGS. 13A-13D present the performance of an embodiment of the intelligent control mechanism. Shortly after the start of the system, the controller regulates the DC link voltage and the reactive power to the voltage and reactive power references (FIG. 13A). For any condition change of the reactive power reference or the energy generation at the renewable source side, the controller regulates the DC link voltage to the desired value much faster and more stably than traditional approaches (reference FIGS. 11A and 13A). The performance of the current loop controllers is demonstrated in FIG. 13B. Compared to traditional approaches, the desired d and q currents can be quickly reached for any practical operating conditions and the optimal control strategy prevents the converter from getting into a nonlinear modulation mode. The oscillation of the measured d and q currents is small, implying an improved power quality for the intelligent control mechanism in terms of the unbalance and harmonics. On the grid side, both real and reactive powers are now much stable even for transitions of a reactive power reference from absorbing to generating (reference FIG. 13C).

The current loop d-q controllers not only have the function to realize the DC link voltage and reactive power control objectives but also play a role to achieve enhanced power quality in terms of unbalance and harmonics. Actually, for any control condition change to new desired d and q current references, an appropriately designed current-loop d-q controller should function in a way to adjust the instantaneous three-phase grid current quickly to a new balanced condition that has the desired d and q current values, i.e., less current unbalance than a control system without an inner current control loop. The proposed embodiments of an intelligent control mechanism handle the current unbalance issue effectively while maintaining the DC link voltage and reactive power control goals. From this aspect, there is a difference between the general control theory and the nested-loop control strategy. For example, for the DC link voltage and reactive power control in grid integration of renewable energies, it is inappropriate for one to develop a control system without unbalance and harmonic control consideration and any performance evaluation of the controller must be conducted in a practical converter switching environment rather than an ideal model based environment.

Examples/Simulations

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

Figure 14:
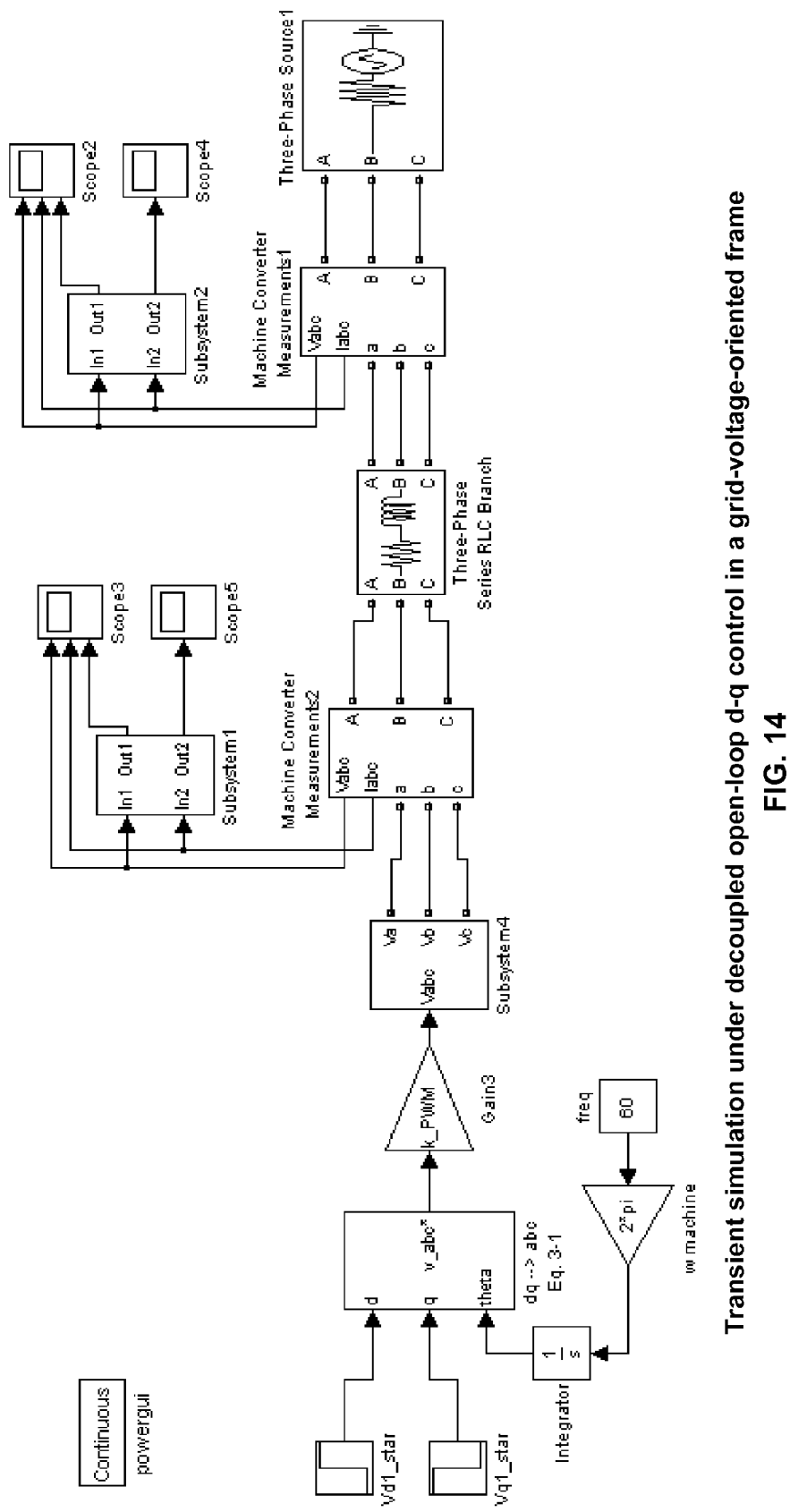
FIG. 14 shows the transient simulation system of the front-end converter system under decoupled open-loop d-q control in a grid-voltage-oriented frame.

FIG. 14 shows the transient simulation system of the front-end converter system in the grid-voltage-oriented frame under a decoupled open-loop d-q control condition. The grid is represented by a three-phase 60 Hz, 690V line-line voltage source. The grid filter has a resistance of 0.012Ω and an inductance of 5 mH. The converter is represented by a three-phase controlled voltage source that is regulated by $V_{d1}^*$ and $V_{q1}^*$ from a decoupled open-loop d-q controller. The converter output voltage, having the grid frequency, is obtained through dq-to-abc transformation based on the grid-voltage space vector position. Major measurements in the transient simulation system include three-phase voltage, current, and real and reactive power before and after the grid filter. For each power measurement, passive sign convention is used, i.e., power absorbed toward the converter is positive.

Figure 15:
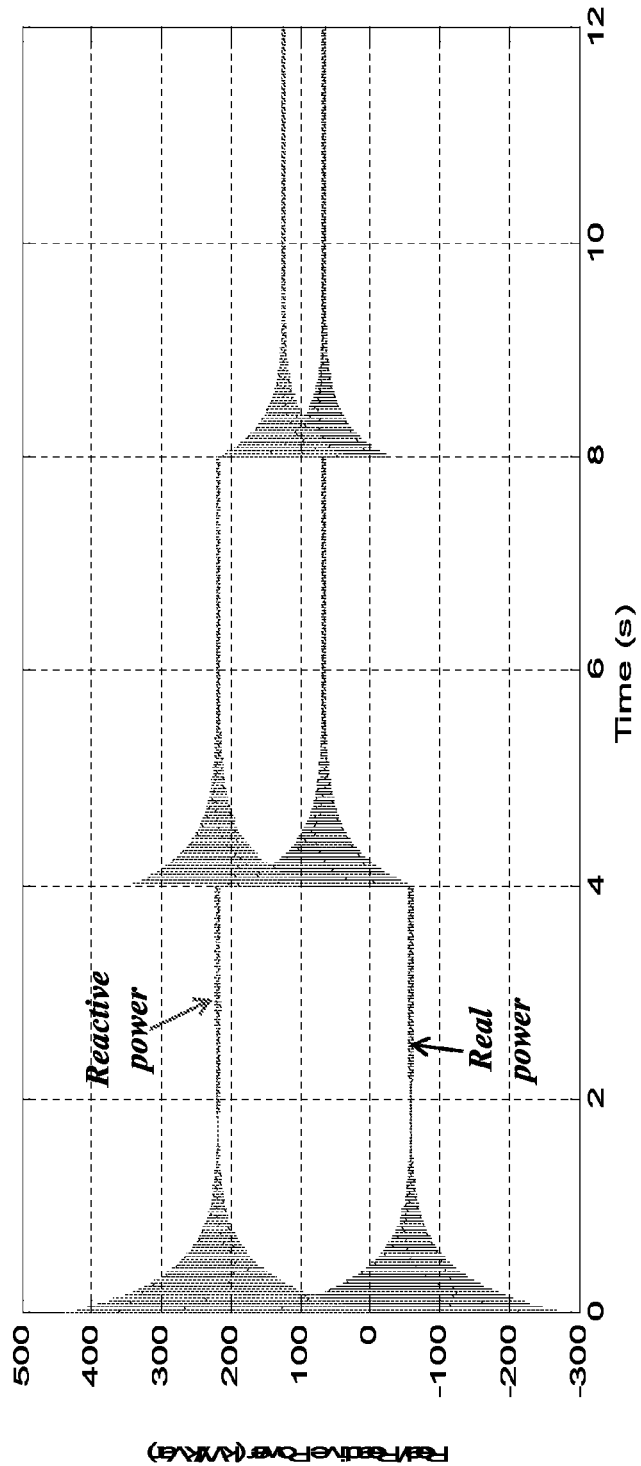
FIG. 15 shows a transient study of power control characteristics under decoupled open-loop d-q control condition as shown by FIG. 14.

FIG. 15 shows a transient study of the power control characteristics under the decoupled open-loop d-q control condition. Before t=4 s, $V_{q1}^*$ and $V_{d1}^*$ have the values of 0.173V and 0.087V, respectively. As the system is stable, the transient results are very close to the steady-state results. The real power is generating and the reactive power is absorbing, which is consistent with FIGS. 6A-6C. At t=4 s, $V_{q1}^*$ changes to −0.173V, causing the real power changing from absorbing to generating but the reactive power almost unchanged (consistent with equation (10) and FIGS. 6A-6C). At t=8 s, $V_{d1}^*$ changes to 0.346V, causing the reactive power to drop but the real power remaining nearly unaffected. An interesting issue shown in FIG. 15 is that whenever there is a control condition change, an evident oscillation occurs in both instantaneous real and reactive power waveforms, which indicates a high current unbalance in $i_a$, $i_b$, and $i_c$.

Figure 16:
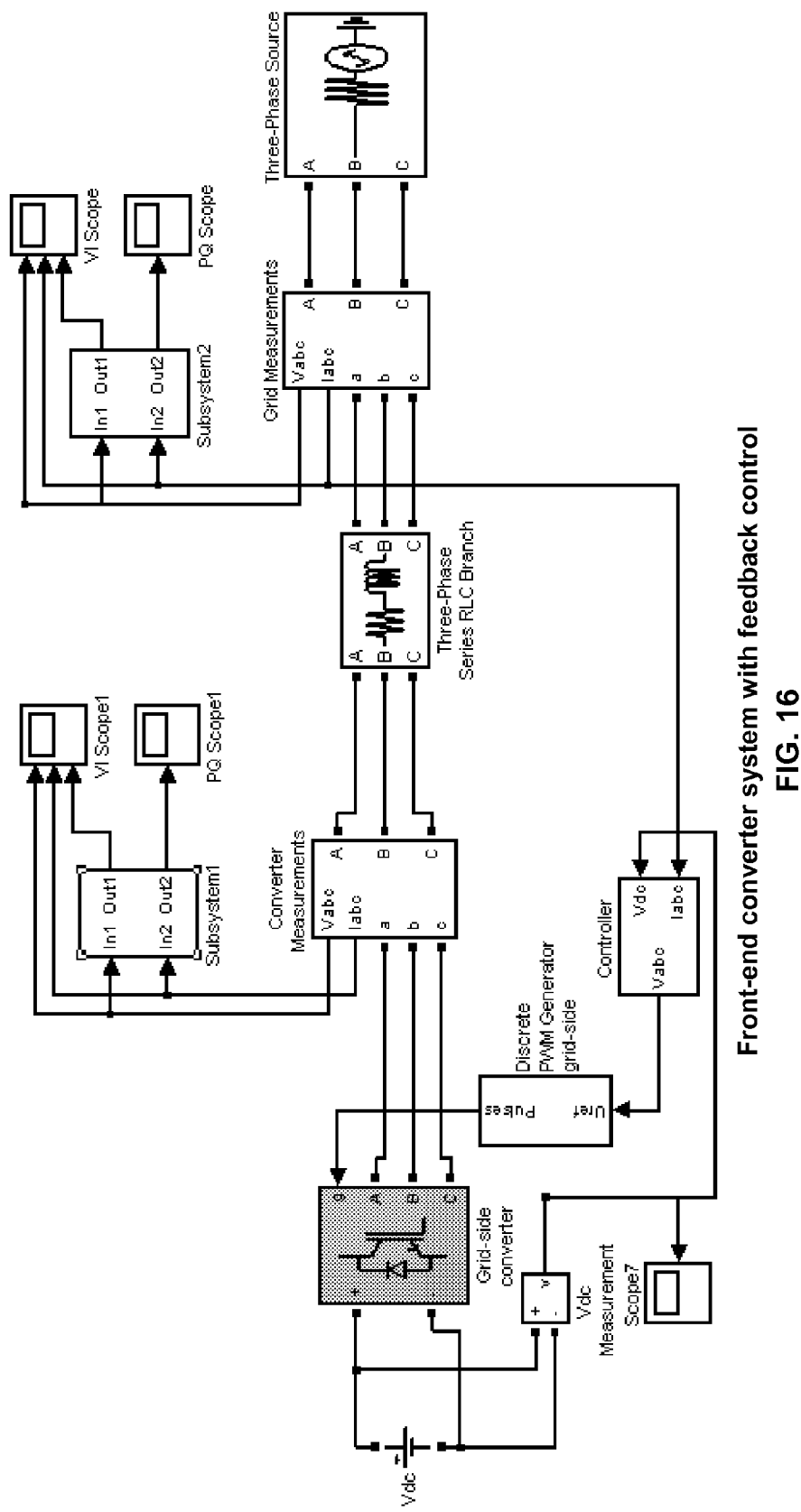
FIG. 16 shows an embodiment of a transient simulation system with the feedback control under the constant DC link voltage condition.

In one example, a traditional current-loop PI controller is designed and evaluated for the following system data that include, for example, 1) a 2000V DC voltage source, 2) a three-phase 60 Hz, 690V line-line AC voltage source, 3) a three-phase PWM converter with a frequency modulation ratio of 30, and 4) a grid filter with a resistance of 0.012Ω and an inductance of 5 mH. Using the frequency response technique, the crossover frequency of the controller is two orders smaller than the switching frequency, and the phase margin is 60°. An embodiment of a transient simulation system with the feedback control is shown by FIG. 16. A normalization saturation is applied to $v_{d1}^*$ and $v_{q1}^*$ to prevent the amplitude of the reference voltage from exceeding the converter linear modulation limit. Depending on real and reactive power references, it is found that the traditional control approaches may or may not function properly.

Figure 17B:
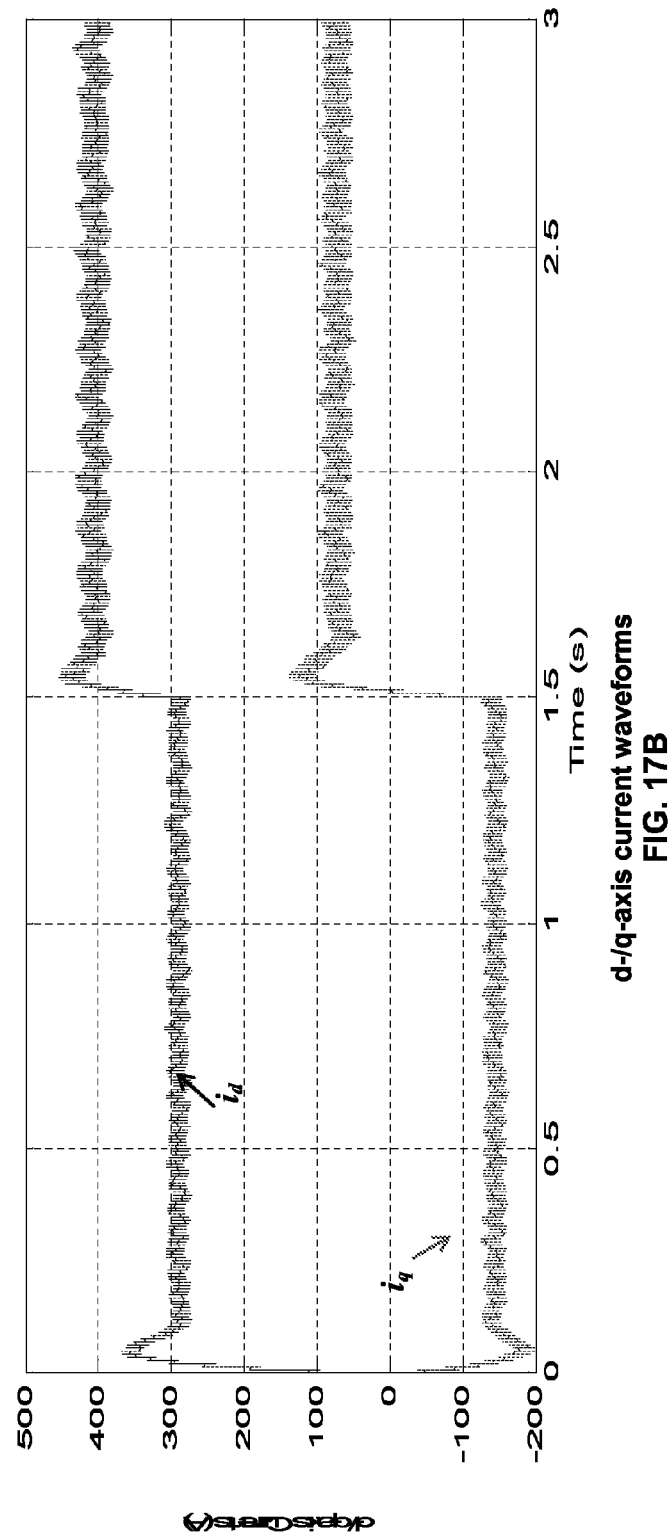

FIGS. 17A and 17B demonstrate a situation that the real and reactive power is controllable using the traditional d-q control approach. The initial real and reactive power references are 200 kW and 100 kVar, respectively, i.e., a condition that both real and reactive power are absorbed by the converter from the grid, which is typical for a doubly-fed induction generator wind turbine. At t=1.5 s, the real and reactive power references change to 280 kW and −50 kVar, respectively, i.e., a condition that real power is absorbing and reactive power is generating. As shown by the instantaneous power waveforms (see FIG. 17A), both real and reactive power can be regulated around the reference values before and after t=1.5 s. The grid d and q currents oscillate around d and q current references (see FIG. 17B), indicating some extent of current unbalance and harmonics associated with the traditional control mechanism.

Figure 18A:
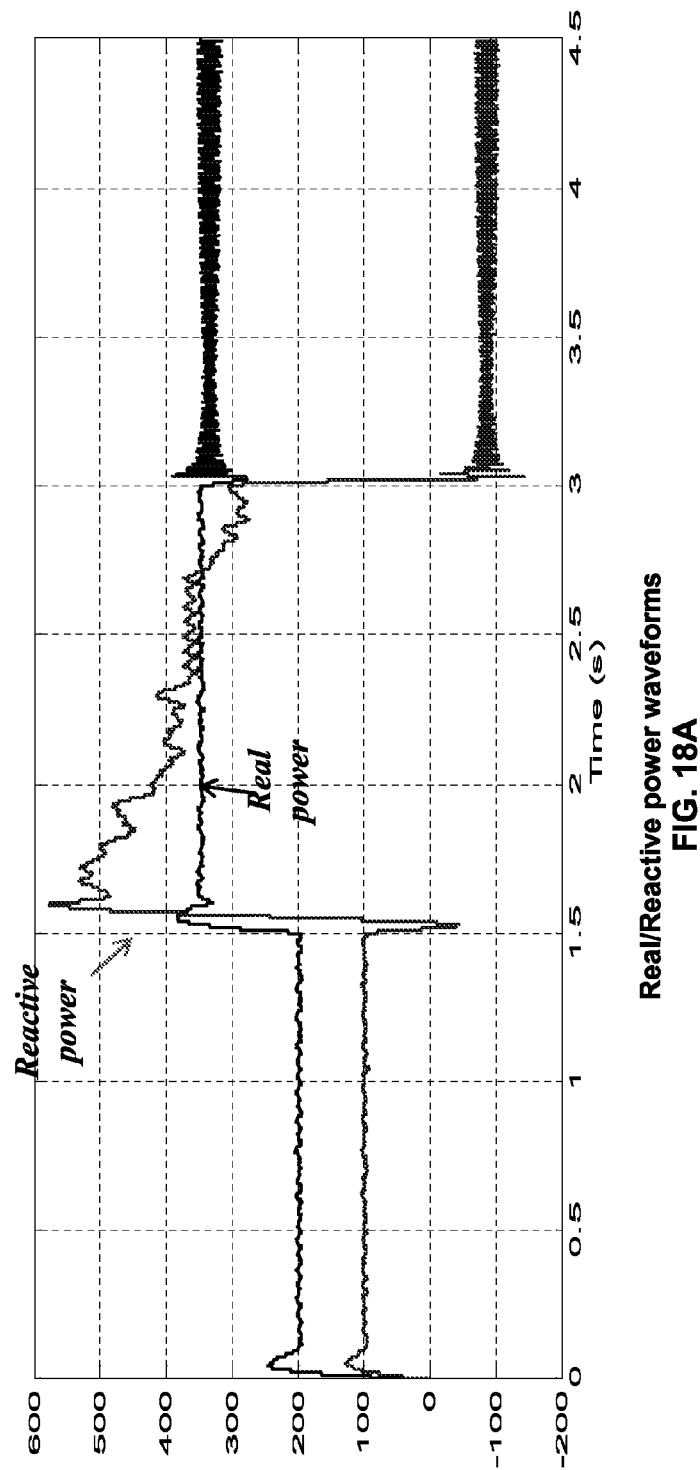
FIGS. 18A and 18B show that, on another hand, malfunctions of the traditional control mechanism are also found, in which the initial real and reactive power references are still 200 kW and 100 kVar under a constant DC link voltage condition as shown by FIG. 16.
Figure 18B:
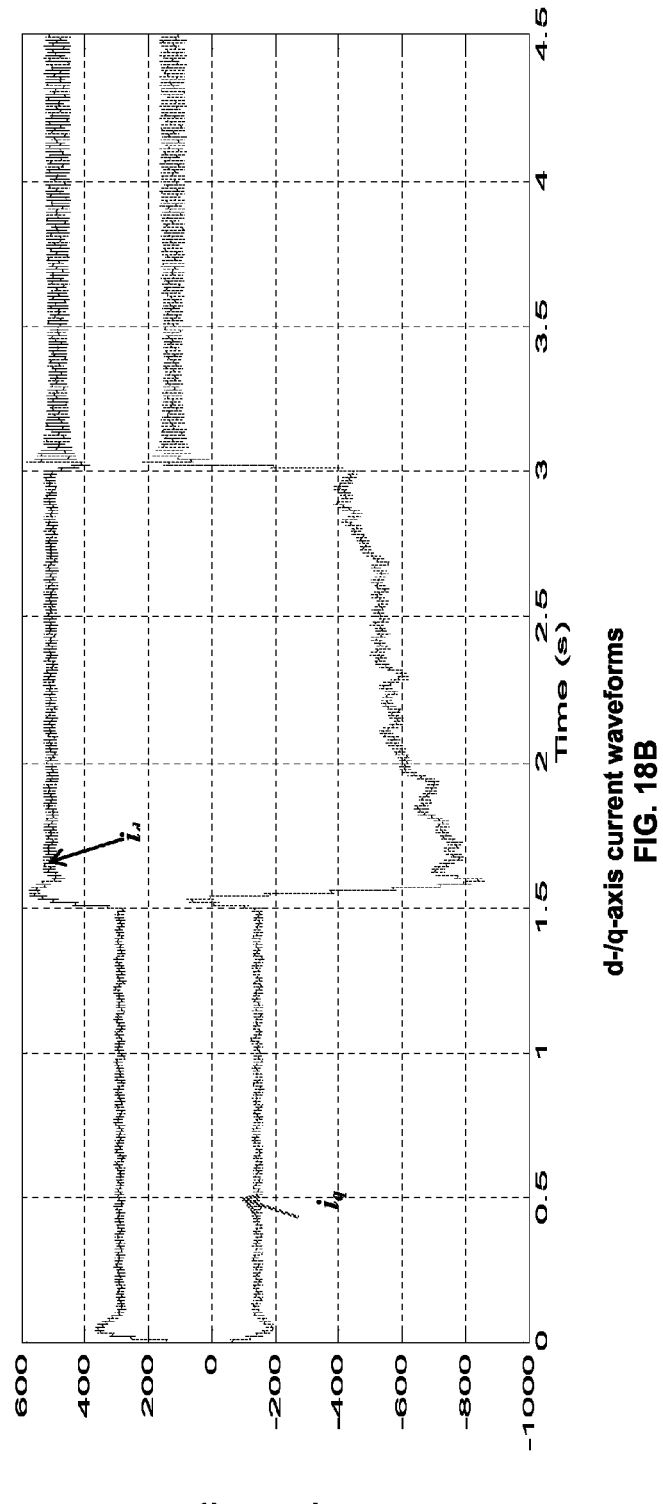

On another hand, malfunctions of the traditional control mechanism are also found as shown by FIGS. 18A and 18B, in which the initial real and reactive power references are 200 kW and 100 kVar. At t=1.5 s, the real and reactive power references change to 350 kW and −50 kVar. At t=3 s, the real and reactive power references change to 280 kW and 0 kVar. As illustrated by FIG. 18A, the traditional control approach is unable to regulate real and reactive power effectively, especially after the converter is over or close to the saturation limitation of $v_{d1}^*$ and $v_{q1}^*$ at t=1.5 s. At t=3 s, although the real and reactive power references is smaller, the malfunction of the controller continues to influence the operation of the system. During the controller malfunction, grid power quality in terms of unbalance and harmonics are greatly deteriorated and the rated power of the converter may be exceeded.

Figure 19A:
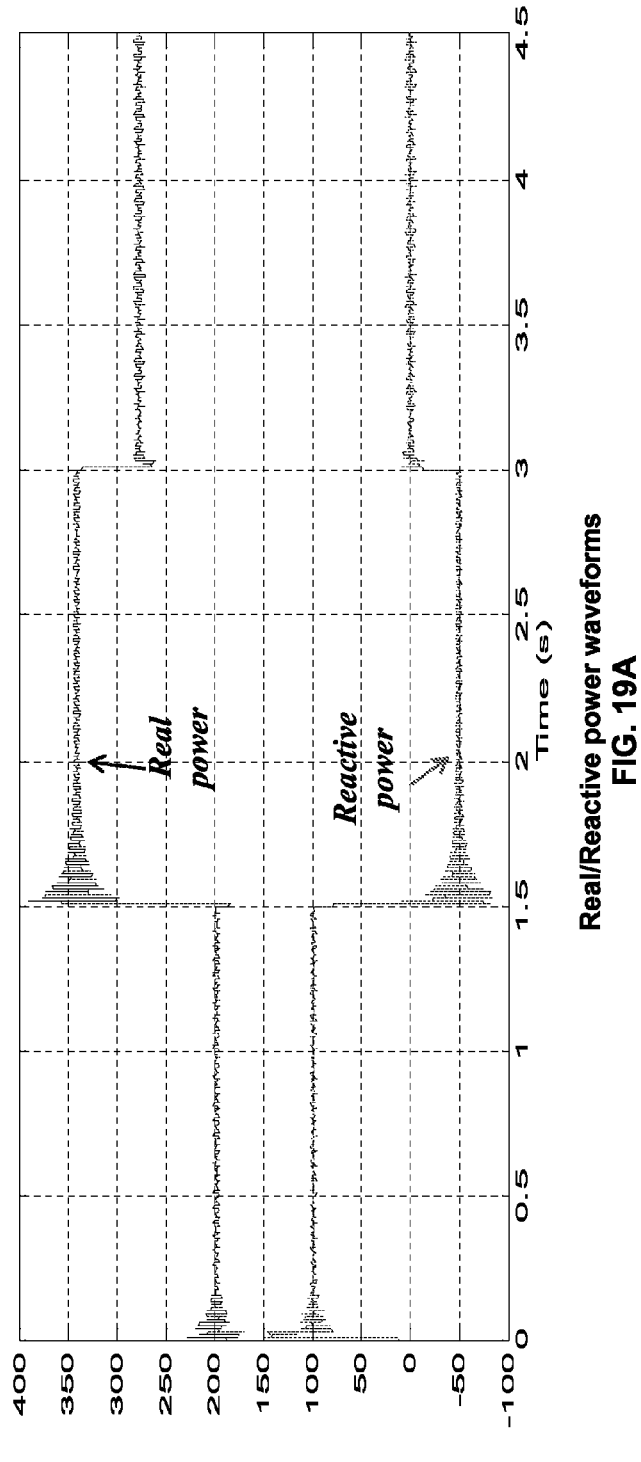
FIGS. 19A and 19B show that the performance of an embodiment of the intelligent control approach for the same conditions as those of FIGS. 18A and 18B.
Figure 19B:
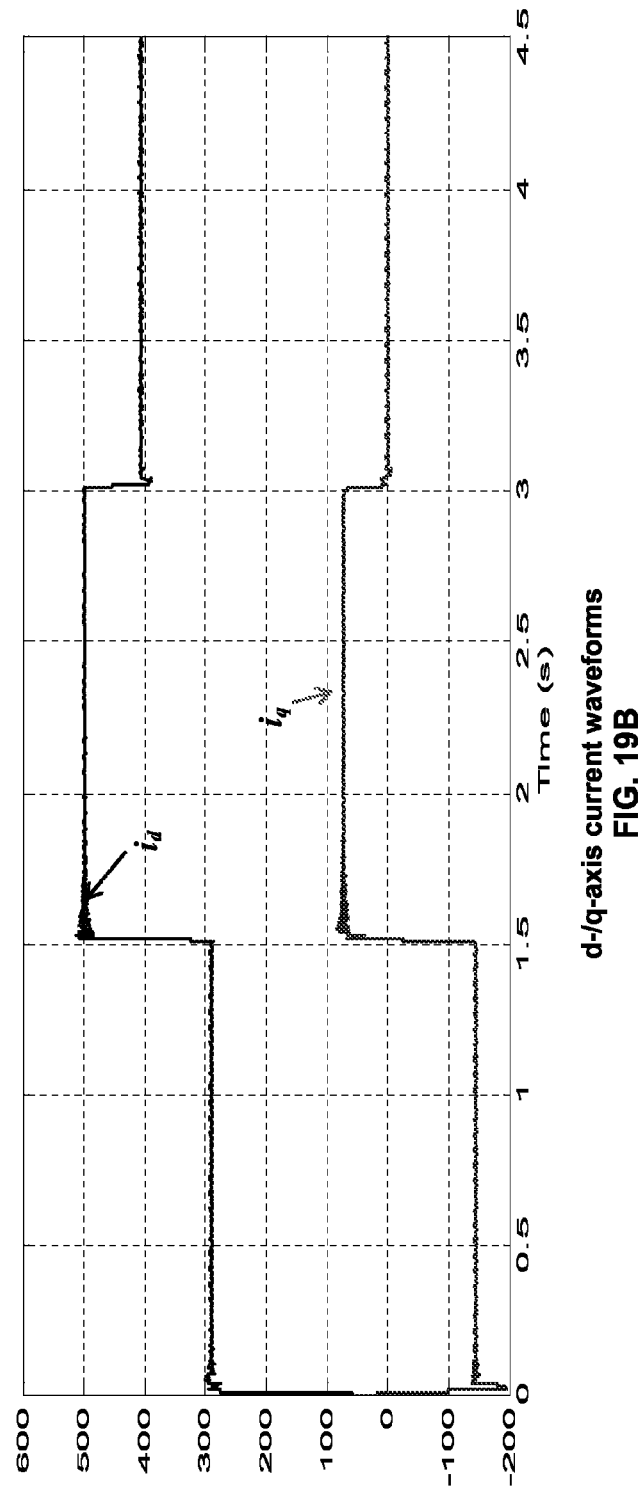

The performance of an embodiment of the intelligent current-loop control approach is demonstrated in FIGS. 19A and 19B for the same conditions as those of FIGS. 18A and 18B. As it can be seen, the oscillation of the instantaneous d and q current waveform is trivial, meaning that the controller is effective in maintaining a high power quality in terms of harmonics and unbalance. As the real and reactive power references change to 280 kW and −50 kVar at t=1.5 s, the controller quickly responses the reference power change by adjusting the actual power to the new reference values.

By comparing FIG. 19A with FIG. 15, it is also interesting to see that the power oscillation for a close-loop controlled front-end converter is much less than that for an open-loop controlled converter although the three-phase control voltage applied to the converter varies rapidly for a close-loop system. Actually, for any condition change to new d and q current references, a properly designed close-loop controller should function in a way to adjust the instantaneous three-phase grid current quickly to a new balanced condition that has the desired d and q current values, i.e., less current unbalance than an open-loop controlled converter.

Figure 20A:
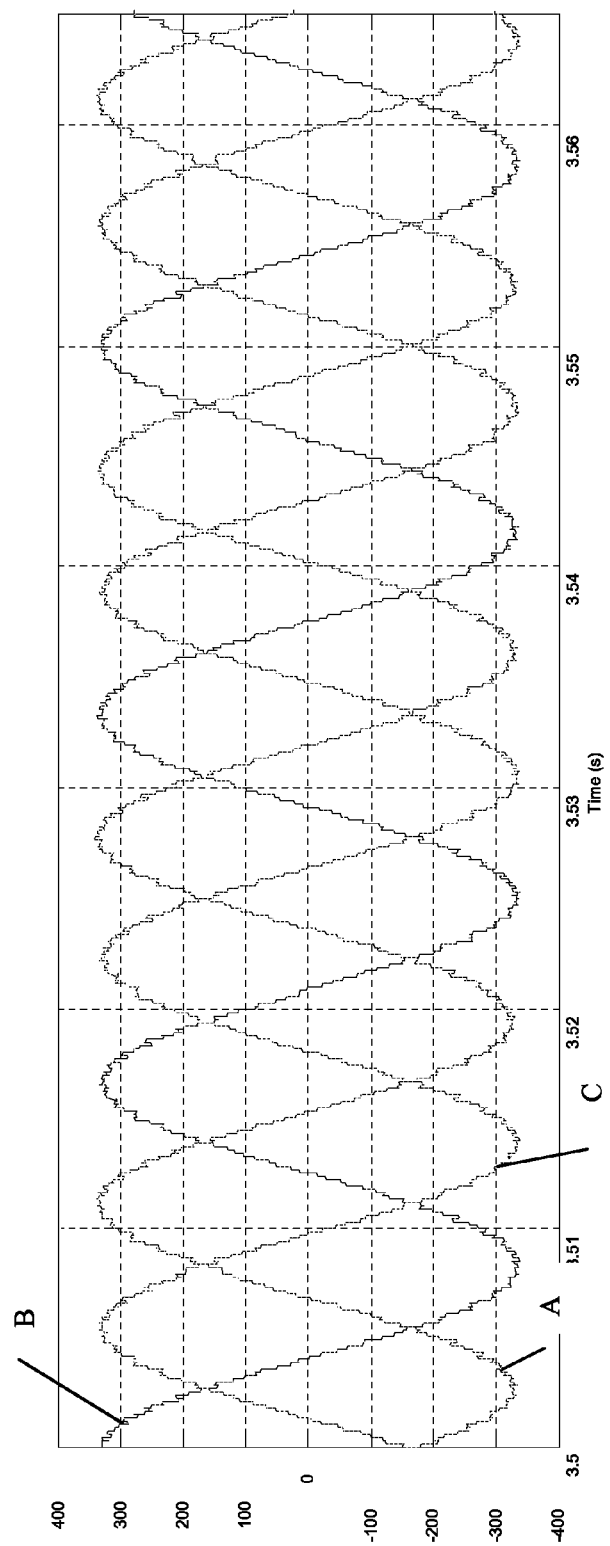

FIGS. 20A and 20B present current waveforms associated with an embodiment of the proposed control approach such as the one shown in FIG. 12A under a constant DC link voltage condition. FIG. 20A gives the grid current waveform when the system is stable at the desired real and reactive power of 200 kW and 100 kVar. Compared to traditional approaches, current waveforms on the three phase lines are very balanced and the total harmonic distortion is reduced. FIG. 20B shows the grid current waveform during the system transition from one power reference (200 kW and 100 kVar) to another (350 kW and −50 kVar). Compared to traditional approaches, the unbalance of the system is much smaller and harmonic distortion is lower, demonstrating improved performance of the proposed mechanism in effective power control as well as improved power quality.

Computer or Computing Device

In the embodiments referenced herein, a "computer," "computing device," "controller," or "server" may be referenced such that steps of the control process may be performed by such computer and the control system can incorporate a computer or processor or a computer may be utilized in performing a simulation of the control systems and methods described herein. Such computer may be, for example, a mainframe, desktop, notebook or laptop, a hand held device such as a data acquisition and storage device, or it may be a processing device embodied within another apparatus such as, for example, a processor incorporated into telephonic system such as a private branch exchange (PBX) system or network devices having processors. In some instances the computer may be a "dumb" terminal used to access data or processors over a network such as the Internet. Turning to FIG. 21A, one embodiment of a computing device is illustrated that can be used to practice aspects of the preferred embodiment. In FIG. 21A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 21B:
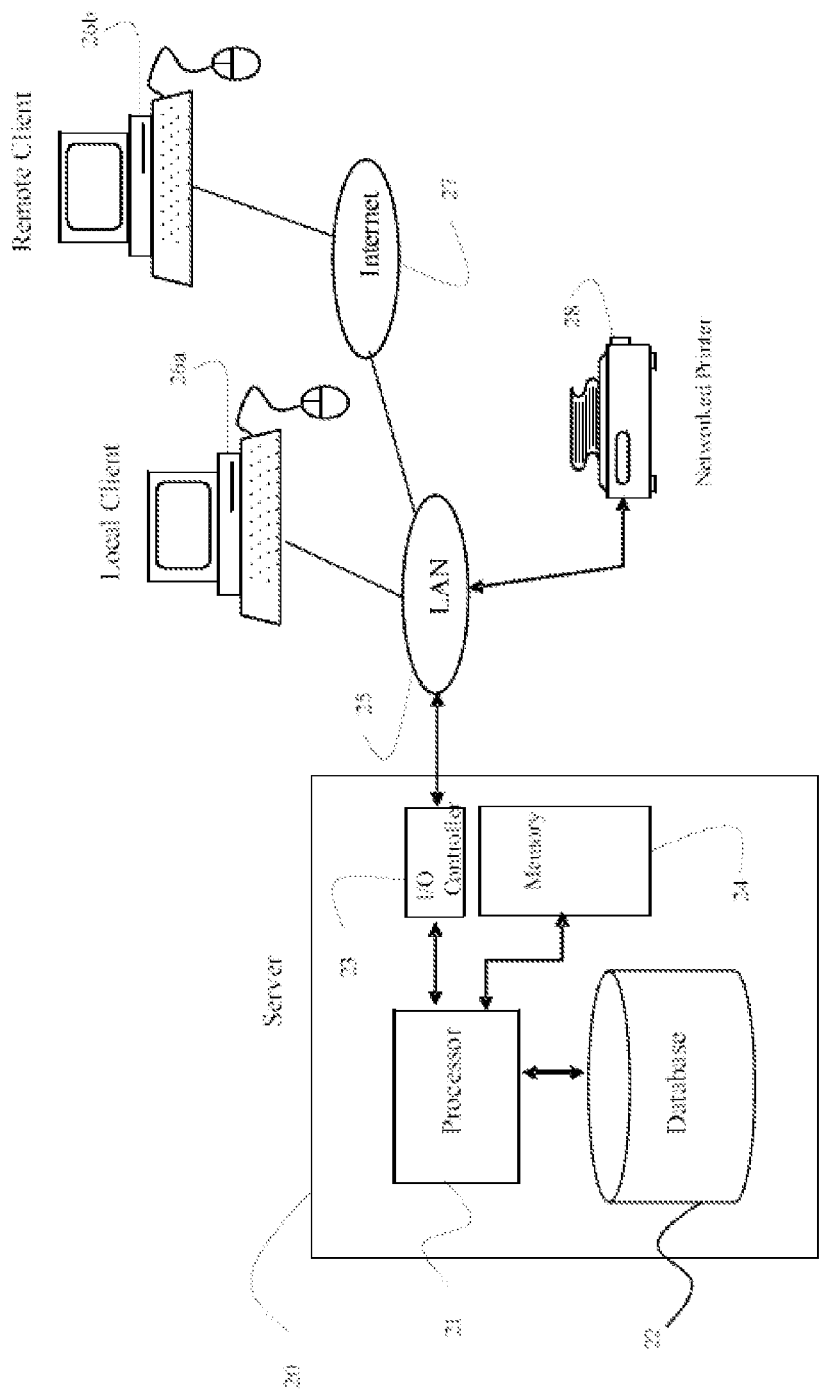
FIG. 21B is an alternative embodiment of a processing system of that shown in FIG. 21A that may be used in embodiments according to the present invention.

An alternative embodiment of a processing system that may be used is shown in FIG. 21B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 21A and 21B can be modified in different ways and be within the scope of the present invention as claimed.

Conclusion

Described herein are new control mechanisms for an enhanced system performance of a front-end converter generally used for grid integration of wind power and other renewable energy sources and for improved control performance of FACTS family devices that use voltage source PWM converters, such as STATCOM, UPFC (unifier power flow controller), and HVDC (high-voltage direct current).

The above represents only a few examples of how a particular system might be implemented. There are numerous variations and additional features and capabilities that might be included in other variants. The above examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention.

Throughout this application, various publications and/or standards may be referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following inventive concepts.

What is claimed is:

1. A method of controlling grid connection of energy sources comprising:

providing an AC/DC/AC PWM frequency converter comprised of a machine-side self-commutated PWM converter, a DC-link, and a grid-side self-commutated PWM converter, wherein the machine-side self-commutated PWM converter is operably connected to an energy source and the grid-side self-commutated PWM converter is operably connected to an electrical grid and the DC-link interconnects the machine-side self-commutated PWM converter and the grid-side self-commutated PWM converter;

providing a control system operably connected to the AC/DC/AC PWM frequency converter, wherein the control system is comprised of a nested current and voltage loop controller;

providing a d-axis control current, $i_d$, to the control system;

processing $i_d$ to prevent harmonic disturbance to the current loop controller;

comparing $i_d$ to a d-axis reference current to create an $i_d$ error signal;

smoothing the $i_d$ error signal;

generating an $i_d$ control current based on the $i_d$ error signal, wherein the $i_d$ control current is used by the nested current and voltage loop controller to control voltage of the DC-link;

providing a q-axis control current, $i_q$, to the control system;

processing $i_q$ to prevent harmonic disturbance to the current-loop controller;
comparing $i_q$ to a q-axis reference current to create an $i_q$ error signal;
smoothing the $i_q$ error signal; and
generating an $i_q$ control current based on the $i_q$ error signal, wherein the $i_q$ control current is used by the nested current and voltage loop controller to control reactive power absorbed from the electrical grid by the grid-side self-commutated PWM converter.

2. The method of claim 1, further comprising
providing a d-q control voltage to the AC/DC/AC PWM frequency converter, wherein said d-q control voltage is computed from the d-axis control current and the q-axis control current generated by the current loop controllers.

3. The method of claim 1, wherein said method maintains a relatively high power quality, relative balance between phases, and low harmonics on said electrical grid.

4. The method of claim 1, wherein said method is used to control a voltage source PWM converter used for grid integration of solar and fuel cell systems.

5. The method of claim 1, wherein said method is used to control a voltage source PWM converter used for FACTS family devices that are based on voltage source PWM converters.

6. The method of claim 1, wherein providing a control system operably connected to the AC/DC/AC PWM frequency converter comprises providing a control system that integrates one or more of PID, fuzzy and adaptive control technologies.

7. The system of claim 1, wherein the control system integrates one or more of PID, fuzzy and adaptive control technologies.

8. The method of claim 1, wherein an optimization strategy is used to prevent the d-axis control current and the q-axis control current from going over a rated current of the AC/DC/AC PWM frequency converter and to prevent the AC/DC/AC PWM frequency converter from getting into a nonlinear modulation mode.

9. The method of claim 1, where smoothing any one of the $i_d$ error signal or the $i_q$ error signal comprises applying a sigmoid function to the $i_d$ error signal or the $i_q$ error signal to reduce unbalance influences that may be generated during control transitions, where the sigmoid function is similar to activation functions employed in artificial neural networks.

10. A system for controlling an energy source comprising:
a AC/DC/AC PWM frequency converter comprised of a machine-side self-commutated PWM converter, a DC-link, and a grid-side self-commutated PWM converter, wherein the machine-side self-commutated PWM converter is operably connected to the renewable energy source and the grid-side self-commutated PWM converter is operably connected to an electrical grid and the DC-link interconnects the machine-side self-commutated PWM converter and the grid-side self-commutated PWM converter; and
a control system comprised of nested d-axis and q-axis current loop controllers and voltage loop controllers operably connected to the AC/DC/AC PWM frequency converter, said d-axis and q-axis current loop controllers and voltage loop controllers comprising one or more signal processors;
wherein the d-axis nested current and voltage loop controllers receive a d-axis current, $i_d$, process $i_d$ to prevent harmonic disturbance to the d-axis current-loop controller, compare $i_d$ to a d-axis reference current to create an $i_d$ error signal, smooth the $i_d$ error signal, and generate an $i_d$ control current based on the $i_d$ error signal, wherein the $i_d$ control current is used by the d-axis nested current and voltage loop controller to control voltage of the DC-link, and
wherein the q-axis nested current and voltage loop controllers receive a q-axis control current, $i_q$, process $i_q$ to prevent harmonic disturbance to the q-axis current-loop controller, compare $i_q$ to a q-axis reference current to create an $i_q$ error signal, smooth the $i_q$ error signal, and generate an $i_q$ control current based on the $i_q$ error signal, wherein the $i_q$ control current is used by the q-axis nested current and voltage loop controller to control reactive power absorbed from the electrical grid by the grid-side self-commutated PWM converter.

11. The system of claim 10, wherein the control system provides a d-q control voltage to the AC/DC/AC PWM frequency converter, said d-q control voltage is computed from the d-axis control current and the q-axis control current generated by the current loop controllers.

12. The system of claim 10, wherein said system is used to control a voltage source PWM converter used for grid integration of solar and fuel cell systems.

13. The system of claim 10, wherein said system is used to control a voltage source PWM converter used for FACTS family devices that are based on voltage source PWM converters.

14. The system of claim 10, wherein an optimization strategy is used to prevent the d-axis control current and the q-axis control current from going over a rated current of the AC/DC/AC PWM frequency converter and to prevent the AC/DC/AC PWM frequency converter from getting into a nonlinear modulation mode.

15. The system of claim 10, where smoothing any one of the $i_d$ error signal or the $i_q$ error signal comprises applying a sigmoid function to the $i_d$ error signal or the $i_q$ error signal to reduce unbalance influences that may be generated during control transitions, where the sigmoid function is similar to activation functions employed in artificial neural networks.

* * * * *